(12) United States Patent
Elisco et al.

(10) Patent No.: US 11,983,498 B2
(45) Date of Patent: May 14, 2024

(54) SYSTEM AND METHODS FOR LANGUAGE PROCESSING OF DOCUMENT SEQUENCES USING A NEURAL NETWORK

(71) Applicant: Augmented Intelligence Technologies, Inc., Northbrook, IL (US)

(72) Inventors: Martin Elisco, Glencoe, IL (US); Jim Lindstrom, Chicago, IL (US); Logan Courtney, Chicago, IL (US)

(73) Assignee: Augmented intelligence Technologies, Inc., Northbrook, IL (US)

( * ) Notice: Subject to any disclaimer, the term of this patent is extended or adjusted under 35 U.S.C. 154(b) by 0 days.

(21) Appl. No.: 17/205,153

(22) Filed: Mar. 18, 2021

(65) Prior Publication Data
US 2022/0300711 A1    Sep. 22, 2022

(51) Int. Cl.
*G06F 40/295* (2020.01)
*G06F 16/93* (2019.01)
(Continued)

(52) U.S. Cl.
CPC ............ *G06F 40/295* (2020.01); *G06F 16/93* (2019.01); *G06F 40/12* (2020.01); *G06F 40/205* (2020.01); *G06N 3/08* (2013.01)

(58) Field of Classification Search
CPC ...... G06F 40/295; G06F 40/12; G06F 40/205; G06F 16/93; G06F 40/216; G06F 40/30;
(Continued)

(56) References Cited

U.S. PATENT DOCUMENTS

| | | | | |
|---|---|---|---|---|
| 4,243,070 A | * | 1/1981 | Jackson | F16K 17/085 137/510 |
| 4,246,184 A | * | 1/1981 | Pressick | C11B 1/04 554/15 |

(Continued)

OTHER PUBLICATIONS

Classification Definitions Class 715, Data Processing: Presentation Processing of Document, Operator Interface Processing, and Screen Saver Display Processing; Feb. 2011; pp. 1-33.*

(Continued)

*Primary Examiner* — Andrew R Dyer
(74) *Attorney, Agent, or Firm* — Caldwell Intellectual Property Law

(57) ABSTRACT

A system and method for natural language processing for document sequences comprises a computing device configured to train a neural network as a function of a corpus of documents, wherein training comprises receiving the corpus of documents, identifying significant terms, and tuning, as a function of the corpus of documents, the neural network to generate a plurality of vectors for each significant term of the plurality of significant terms, a vector in a vector space representing semantic relationships between the significant terms and semantic units in the corpus of documents, receive a current document sequence including a plurality of documents in a sequential order, map a plurality of mapped terms of the plurality of significant terms to the plurality of documents as a function of the neural network and the plurality of vectors, and generate a plurality of timelines as a function of the sequential order and the mapped terms.

20 Claims, 13 Drawing Sheets

(51) Int. Cl.
*G06F 40/12* (2020.01)
*G06F 40/205* (2020.01)
*G06N 3/08* (2023.01)

(58) Field of Classification Search
CPC ...... G06F 3/08; G06N 3/0455; G06N 3/0464; G06N 3/0499; G06N 3/0895; G06N 3/096; G06F 7/01
USPC ............................................. 715/200
See application file for complete search history.

(56) References Cited

U.S. PATENT DOCUMENTS

| | | | | |
|---|---|---|---|---|
| 4,257,482 A * | 3/1981 | Kompanek | ............ | E21B 43/003 166/105 |
| 4,269,611 A * | 5/1981 | Anderberg | ............ | F24F 3/1423 96/124 |
| 4,269,744 A * | 5/1981 | Hulyalkar | ............ | C08K 13/02 524/567 |
| 4,272,640 A * | 6/1981 | Baumbach | ............ | E03F 7/04 137/110 |
| 4,273,374 A * | 6/1981 | Portman | ............ | A61G 3/001 248/222.52 |
| 4,281,805 A * | 8/1981 | Vackier | ............ | B65H 19/28 242/532.7 |
| 4,286,481 A * | 9/1981 | Miller | ............ | F16H 1/2854 475/242 |
| 4,288,558 A * | 9/1981 | Schmidt | ............ | C07C 29/158 502/161 |
| 4,299,530 A * | 11/1981 | Schaeff | ............ | E02F 9/18 414/719 |
| 4,301,570 A * | 11/1981 | Thomas | ............ | E05D 11/06 16/85 |
| 4,302,939 A * | 12/1981 | Golestaneh | ............ | F03G 7/065 60/527 |
| 4,310,334 A * | 1/1982 | Waldron | ............ | C01B 32/907 423/439 |
| 4,320,333 A * | 3/1982 | Hase | ............ | H02J 7/0071 320/159 |
| 4,324,078 A * | 4/1982 | Gray | ............ | H02G 3/185 169/48 |
| 4,324,921 A * | 4/1982 | Arpe | ............ | B01J 23/02 568/427 |
| 4,330,553 A * | 5/1982 | Simonidesz | ............ | C07D 307/937 514/469 |
| 4,334,908 A * | 6/1982 | Duchateau | ............ | C03C 3/16 71/52 |
| 4,336,606 A * | 6/1982 | Heard | ............ | G01S 15/899 367/117 |
| 4,338,499 A * | 7/1982 | Chabala | ............ | H01H 9/26 200/50.33 |
| 4,338,737 A * | 7/1982 | Lehmann | ............ | G09F 3/207 40/1.5 |
| 4,347,679 A * | 9/1982 | Grunig | ............ | F41A 19/58 42/84 |
| 4,352,957 A * | 10/1982 | Ruether | ............ | H04J 3/175 370/435 |
| 4,355,357 A * | 10/1982 | Chan | ............ | G01V 3/38 324/323 |
| 4,359,761 A * | 11/1982 | Papst | ............ | G11B 15/26 310/114 |
| 4,360,187 A * | 11/1982 | Chapman | ............ | B66F 5/04 254/8 R |
| 4,362,072 A * | 12/1982 | Tillman | ............ | B25B 17/02 81/57.13 |
| 4,365,112 A * | 12/1982 | Ruether | ............ | H04J 3/175 370/435 |
| 4,366,353 A * | 12/1982 | Evans | ............ | H01H 31/10 200/324 |
| 4,367,229 A * | 1/1983 | Kokosi | ............ | A61P 9/08 514/259.1 |
| 4,375,510 A * | 3/1983 | Jordan | ............ | C12Q 1/045 435/243 |
| 4,381,127 A * | 4/1983 | Visser | ............ | F16C 33/1065 384/151 |
| 4,436,326 A * | 3/1984 | Peaster | ............ | F16L 27/00 285/148.27 |
| 4,448,396 A * | 5/1984 | Delago | ............ | B66D 1/52 254/340 |
| 4,551,623 A * | 11/1985 | Elliott | ............ | G01J 5/30 250/208.1 |
| 4,555,258 A * | 11/1985 | Curiel | ............ | C03B 11/02 65/265 |
| 4,770,410 A * | 9/1988 | Brown | ............ | A61H 3/04 135/67 |
| 4,796,926 A * | 1/1989 | Rapsilver | ............ | E03F 1/008 141/311 R |
| 4,806,203 A * | 2/1989 | Elton | ............ | D21C 9/1026 162/19 |
| 4,836,893 A * | 6/1989 | Gloersen | ............ | D21C 7/00 162/237 |
| 4,921,707 A * | 5/1990 | Racz | ............ | A61K 9/0095 424/468 |
| 5,188,692 A * | 2/1993 | Horvath | ............ | B32B 17/10825 156/163 |
| 5,202,667 A * | 4/1993 | Alvin | ............ | G08B 21/20 340/605 |
| 5,250,146 A * | 10/1993 | Horvath | ............ | B32B 17/10825 100/295 |
| 5,406,914 A * | 4/1995 | Hyppanen | ............ | F23C 10/02 122/4 D |
| 5,494,546 A * | 2/1996 | Horvath | ............ | B29C 51/085 100/295 |
| 5,637,144 A * | 6/1997 | Whatcott | ............ | C04B 28/04 106/718 |
| 6,036,446 A * | 3/2000 | Goodman | ............ | F01M 11/045 137/15.05 |
| 6,145,625 A * | 11/2000 | Prokop | ............ | F16N 11/10 184/105.2 |
| 8,010,508 B2 * | 8/2011 | Audet | ............ | G06T 11/206 707/726 |
| 8,356,248 B1 * | 1/2013 | Killalea | ............ | G06Q 30/0601 715/273 |
| 8,433,993 B2 * | 4/2013 | Weinberger | ............ | G06F 16/4387 715/202 |
| 9,251,139 B2 | 2/2016 | Bateman | | |
| 9,740,731 B2 | 8/2017 | Gross | | |
| 10,042,880 B1 * | 8/2018 | Bodapati | ............ | G06N 20/20 |
| 10,303,771 B1 | 5/2019 | Jezewski | | |
| 10,444,945 B1 | 10/2019 | Fehlman, II | | |
| 10,725,827 B2 | 7/2020 | Swamy | | |
| 10,740,561 B1 | 8/2020 | Cao | | |
| 10,776,399 B1 * | 9/2020 | Rajpara | ............ | G06F 16/285 |
| 10,796,097 B2 | 10/2020 | Dey | | |
| 2005/0138056 A1* | 6/2005 | Stefik | ............ | G06F 16/3328 707/999.102 |
| 2007/0300170 A1* | 12/2007 | Bier | ............ | G06F 16/338 715/764 |
| 2009/0070662 A1* | 3/2009 | Audet | ............ | G06F 3/04842 715/212 |
| 2012/0278263 A1* | 11/2012 | Borthwick | ............ | G06N 20/00 706/12 |
| 2014/0350961 A1 | 11/2014 | Csurka | | |
| 2015/0164377 A1* | 6/2015 | Nathan | ............ | A61B 5/6802 600/595 |
| 2016/0004667 A1* | 1/2016 | Chakerian | ............ | G06F 16/24578 715/277 |
| 2016/0196334 A1* | 7/2016 | Bastide | ............ | G06F 16/3329 707/776 |
| 2017/0188895 A1* | 7/2017 | Nathan | ............ | A61B 5/1118 |
| 2017/0270250 A1 | 9/2017 | Dettman | | |
| 2018/0095938 A1* | 4/2018 | Monte | ............ | G06F 3/0488 |
| 2018/0121549 A1* | 5/2018 | Ramesh | ............ | G06F 16/9535 |
| 2019/0007362 A1* | 1/2019 | Shmunis | ............ | H04L 51/36 |
| 2019/0102614 A1 | 4/2019 | Winder | | |
| 2019/0147297 A1* | 5/2019 | Rogers | ............ | G06F 18/2155 706/12 |

(56) References Cited

U.S. PATENT DOCUMENTS

| | | | |
|---|---|---|---|
| 2019/0213407 A1 | 7/2019 | Toivanen | |
| 2020/0126012 A1* | 4/2020 | Bailey | G06N 5/02 |
| 2020/0142966 A1* | 5/2020 | Qian | G06F 16/3331 |
| 2020/0279271 A1* | 9/2020 | Gasperecz | G06N 20/00 |
| 2020/0334416 A1 | 10/2020 | Vianu | |
| 2020/0388358 A1* | 12/2020 | Chen | G06F 18/217 |
| 2020/0409960 A1* | 12/2020 | Mithal | G06N 5/01 |
| 2021/0004583 A1* | 1/2021 | Evans | G06V 30/414 |
| 2021/0034812 A1* | 2/2021 | Mezaoui | G06N 5/01 |
| 2021/0150281 A1* | 5/2021 | Tsai | G06N 3/08 |
| 2021/0286989 A1* | 9/2021 | Zhong | G06F 40/177 |
| 2022/0179916 A1* | 6/2022 | Muthuswamy | G06N 20/00 |
| 2022/0207730 A1* | 6/2022 | Arnold | G16H 15/00 |
| 2022/0414137 A1* | 12/2022 | Sewak | G06F 16/3344 |

OTHER PUBLICATIONS

Gomes et al., A Survey on Ensemble Learning for Data Stream Classification; Mar. 2017; ACM Computing Surveys; vol. 50; Issue 2; Article No. 23; pp. 1-36.*

Reference Notes: Proceedings of the 3rd Clinical Natural Language Processing Workshop, pp. 234-242 Title: Joint Learning with Pre-trained Transformer on Named Entity Recognition and Relation Extraction Tasks for Clinical Analytics Date: Nov. 2020 by: Miao Chen.

Reference Notes: Conference and Labs of the Evaluation Forum (CLEF 2020), vol. 2696, No. Paper 171, pp. 1-17 Title: Robust named entity recognition and linking on historical multilingual documents Date: Sep. 22, 2020 by: Emanuela Boros.

Reference Notes: arXiv preprint arXiv:2011.06993; pp. 1-8 Title: FLERT: Document-Level Features for Named Entity Recognition Date: Nov. 13, 2020 by: Stefan Schweter.

* cited by examiner

SYSTEM AND METHODS FOR LANGUAGE PROCESSING OF DOCUMENT SEQUENCES USING A NEURAL NETWORK

FIELD OF THE INVENTION

The present invention generally relates to the field of artificial intelligence. In particular, the present invention is directed to a system and method for natural language processing for document sequences.

BACKGROUND

Natural language processing often results in poor textual recognition as computing devices often cannot understand phrases and/or semantic meanings. This is further complicated by the plurality of terms and phrases that are always changing due to generational nuances. Furthermore, consumers become frustrated with the lack of capabilities of natural language processing products in the market.

SUMMARY OF THE DISCLOSURE

In an aspect a system for natural language processing for document sequences including a computing device is configured to train a neural network as a function of a corpus of documents, wherein training comprises receiving the corpus of documents, identifying a plurality of significant terms, and tuning, as a function of the corpus of documents, the neural network to generate a plurality of vectors, the plurality of vectors including, for each significant term of the plurality of significant terms, a vector in a vector space representing semantic relationships between the plurality of significant terms and a plurality of semantic units in the corpus of documents, receive a current document sequence including a plurality of documents in a sequential order, map a plurality of mapped terms of the plurality of significant terms to the plurality of documents as a function of the neural network and the plurality of vectors, and generate a plurality of timelines as a function of the sequential order and the plurality of mapped terms.

In another aspect a method for natural language processing for document sequences includes training, by a computing device, a neural network as a function of a corpus of documents, wherein training comprises receiving the corpus of documents, identifying a plurality of significant terms, and tuning, as a function of the corpus of documents, the neural network to generate a plurality of vectors, the plurality of vectors including, for each significant term of the plurality of significant terms, a vector in a vector space representing semantic relationships between the plurality of significant terms and a plurality of semantic units in the corpus of documents, receiving, by the computing device, a current document sequence including a plurality of documents in a sequential order, mapping, by the computing device, a plurality of mapped terms of the plurality of significant terms to the plurality of documents as a function of the neural network and the plurality of vectors, and generating, by the computing device, a plurality of timelines as a function of the sequential order and the plurality of mapped terms.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for natural language processing for document sequences. In an embodiment, embodiments described in this disclosure allow for training of a neural network as a function of a plurality of significant terms in a corpus of documents. Aspects of the present disclosure may be used to map terms in a current document sequence. Aspects of the present disclosure can also be used for generating a plurality timelines as a function of the mapped terms. Aspects of the present disclosure allow for generating timelines according to one or more mapped terms and/or current document sequences. Exemplary embodiments illustrating aspects of the present disclosure are described below in the context of several specific examples.

Figure 1:
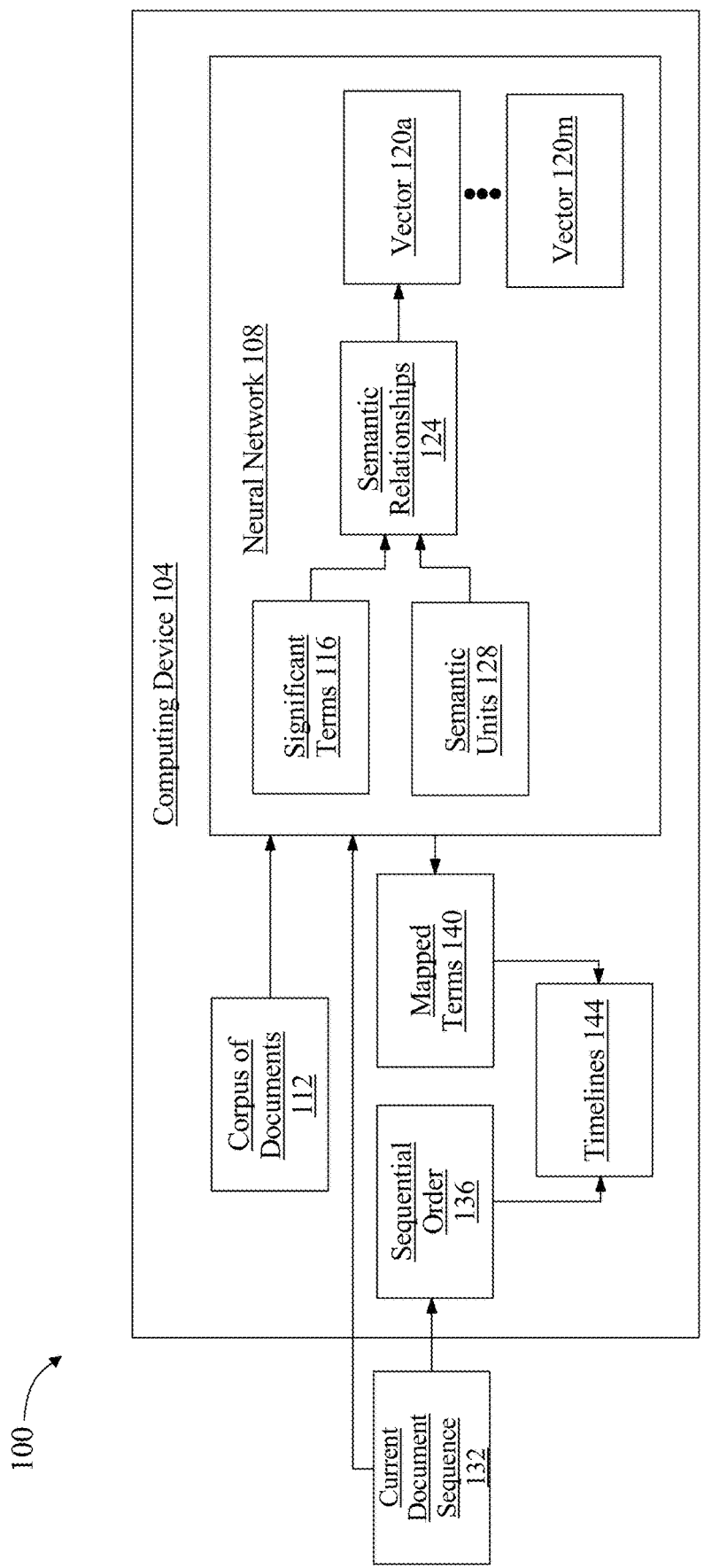
FIG. 1 is a block diagram illustrating an exemplary embodiment of a system for natural language processing for document sequences.

Referring now to FIG. 1, an exemplary embodiment of a system 100 for natural language processing for document sequences is illustrated. System includes a computing device 104. computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 trains a neural network 108 as a function of a corpus of documents 112. As used in this disclosure a "neural network" is a data structure that is constructed and trained to recognize underlying relationships in a set of data through a process that mimics the way neurological tissue in nature, such as without limitation the human brain, operates. Relationships in neural network 108 may include weights relating to different relationships between particular inputs to a "node" in the network and an output thereof, where a node is an atomic data structure a plurality of which are combined to form the network as described in further detail below. As a non-limiting example, a weight may be identified according to a mathematical and/or computational model for information processing based on previous identified relationships. Neural network 108 may represent and/or perform non-linear statistical data modeling and/or decision-making algorithms. Neural network 108 may learn representations of inputs that capture salient characteristics of the input description and generate outputs as a function of the representations. As a non-limiting example neural network 108 may include a recurrent Hopfield network. As used in this disclosure a "recurrent Hopfield network" is a form of a recurrent neural network that serve as a content-addressable memory system with binary threshold nodes. For example, and without limitation, recurrent Hopfield network may converge to an expected local minimum value and/or local minimum as a function of the input and the previously stored memory of the neural network. A neural network may include an "input layer" of nodes which receive inputs to the network, an "output layer" of nodes that produces one or more outputs from the network, and at least one "hidden layers" that receives outputs from the input layer and provides outputs to the output layer. Where there are two or more hidden layers, a neural network may be described as performing "deep learning." A neural network 108 may include a transformer model. As used in this disclosure a "transformer model" is a deep learning model for processing sequential data, such as natural language, for tasks such as translation and text summarization. As a non-limiting example a transformer model may include pre-trained systems such as Bidirectional Encoder Representations from Transformers (BERT) and/or Generative Pre-trained Transformer (GPT). Transformer model may include scaled dot-product attention units that learn three weight matrices including query weights, key weights, and value weights. Transformer network may be implemented, as a non-limiting example, using RoBERTa, as created by Facebook Research Group of Menlo Park Calif. Neural network 108 and/or a base network as described blow may be a specific instantiation of a Transformer deep learning network.

Further referring to FIG. 1, neural network 108 may be trained using a corpus of documents. As used in this disclosure "corpus of documents" are a collection of texts, recordings, and/or representations of documents. As a non-limiting example, corpus of documents 112 may include texts, recordings, and/or representations associated with child welfare documents, wherein child welfare documents may include case notes, investigation narratives, case plans, and/or court reports. Additionally or alternatively, corpus of documents 112 may include textual representations and/or transcripts of video recordings, audio recordings, and/or codified familial input as a function of a child welfare case. Alternatively or additionally, corpus of documents may include documents on a broader variety of subjects. Corpus of documents may include a large quantity of documents.

Still referring to FIG. 1, corpus of documents 112 may be received from various sources. For instance, and without limitation, agencies may provide their narrative data in a variety of different formats. In an embodiment, computing device may create an agency-specific extract, transform, load (ETL) procedure, module, and/or protocol, where each agency-specific ETL procedure, module, and/or protocol may be used to extract, transform, and/or load terms, tokens, and/or other semantic units from documents relating to a specific agency such as a child welfare agency or the like; extraction may be performed according any process and/or process step as described in this disclosure. In an embodiment, agency-specific ETLs may be created to allow data from one or more agencies to work within a natural language processing pipeline; actions performed by agency-specific ETLs may include such steps as removing HTML, tags, note formatting, new line prediction, and/or maintaining structured data, such as case identifiers, note identifiers, dates, authors, or the like, to accompany each note.

With continued reference to FIG. 1, generation of training data may include division of each document, such as without limitation each progress note, into sentences before training. This may be done using, without limitation, a sentencizer, defined as a program that identifies and differentiates sentences in a text. Sentencizer may include any suitable sentencizer, including a SPACY sentencizer as provided by ExplosionAI GmbH of Berlin, Germany, or a similar sentencizer. Sentencization may be performed, without limitation, using a simple pipeline component to allow custom sentence boundary detection logic; pipeline component and/or algorithm may not require a dependency parse. Sentence segmentation may alternatively or additionally be performed by a dependency parser and/or statistical model.

In an embodiment, and still referring to FIG. 1, neural network 108 and/or a training data classifier as described in further detail below may be trained to perform sentence taxonomy, or classification of sentences into a pre-defined list of categories relevant to one or more social services domains. Taxonomy, and/or training data train neural network 108 and/or a training data classifier to perform taxonomy, may be built based on information from academic publications, social service program guidelines, and/or feedback from case workers/supervisors; that is, such information and/or feedback may be correlated and/or paired with sentences in one or more corpuses to form training examples that may be used to train neural network 108 to perform sentence taxonomy. At a highest level, sentence taxonomy may identify two primary groupings: Risk/Protective Factors (RF/PF) and Social Determinants of Health (SDOH). These groupings may be well established in relevant fields and may be used to form case overviews. In an embodiment, alternative or additional high-level groupings may be employed; for instance, agencies may request any additional high-level groupings should it be necessary as framework and/or taxonomy generalizes to other categories used by social services clinicians. At a lower level, taxonomy may organize sentences to components, which may break high-level groupings as described above down into a set of more fine-grained categories. This structure may provide two main benefits: first, a resulting taxonomy may be easier to label and second, the taxonomy may facilitate training processes. Components may be hidden from a final user, albeit they may remain fundamental to inner workings of further steps and/or developments as described in further detail below.

Continuing to refer to FIG. 1, computing device may be configured to perform data labeling with regard to sentences. A number of progress notes for a particular agency may range from hundreds of thousands to millions; as a result, even with a well-defined sentence taxonomy, it may be nearly impossible to label every sentence. Given one million notes with 250 words and an average reading speed of 250 words per minute, it would take nearly 700 days to simply read all of them, let alone label them accurately. There may be multiple sources of labels for different aspects of the problem.

In an embodiment, and with further reference to FIG. 1, a computing device may perform labeling using a weak labeler. As used in this disclosure, "weak" labeling signifies a labeling process in which not every sentence labeled is hand-verified. This may be is implemented by a matching algorithm that matches words and/or phrases based on pattern worlds, such as without limitation using SPACY Matcher as provided by ExplosionAI GmbH of Berlin, Germany, or a similar algorithm. Approximately two to three thousand pattern rules that contribute to some three to four hundred components may be employed. A second stage of a weak labeler may attach additional labels for RF/PF and SDOH based on Boolean expressions composed of various components. In an embodiment, pattern rules may be hand-crafted based on feedback from case workers and reading various subsets of progress notes. In this sense, case workers may be typically looking for very specific combinations of words with an emphasis on reducing a number of false labels at the cost of some missed detections (false negatives).

Still referring to FIG. 1, workers may be trained to write in a formulaic way making pattern matching a particular effective method for labeling a large number of important sentences. However, there still may exist a significant number of complex variations that remain difficult to construct pattern rules for. To capture this nuance a volume of hand-labeled sentences to supplement the labeled sentences from the weak labeler may be used.

Further referring to FIG. 1, computing device 104 may implement entity labeling, which may include a process to label named entities within sentences. Entity labels may be provided from any suitable source, such as without limitation an open-source BERT model (see dslim/bert-base-NER) pretrained on the CoNLL-2003 Named Entity Recognition dataset. The output is converted to a character span representing the location of an entity within each note, or the like. In this sense, entity labels may also be "weak" considering they may not be hand verified. These weak entity labels may be supplemented with additional hand labeled entities.

In an embodiment, and further referring to FIG. 1, labeled data sets as described above may be used as training data to train neural network 108 to label sentences, classify sentences and/or other semantic units to taxonomies, and/or to identify and/or recognize entities, as described below. Any of these processes may be performed with agency-specific training sets and/or corpuses, which may be selected as described above. Elements of taxonomies used to label sentences, terms, and/or other semantic terms may correspond to, be linked to, and/or include significant terms as described in further detail below.

Still referring to FIG. 1, computing device 104 trains neural network 108 by identifying a plurality of significant terms 116. As used in this disclosure "significant terms" are any string of symbols, text, and/or depictions that represent one or more objects and/or entities that influence a child welfare case. In addition to single words made of letters in the conventional sense, the meaning of "term" as used herein includes without limitation a phrase made of such words, a sequence of nucleotides described by AGTC notation, any string of numerical digits, and any string of symbols whether their meanings are known or unknown to any person. As a non-limiting example, significant terms 116 may include terms associated with abuse, substance abuse, legal proceedings, neglect, abandonment, head trauma, safety, relinquish a child, lack of childcare, lack of child support, adequacy of foster care, early childhood education, and the like thereof.

Still referring to FIG. 1, computing device 104 trains neural network 108 by tuning, as a function of corpus of documents 112, neural network 108 to generate a plurality of vectors 120*a-m*. As used in this disclosure a "vector" as defined in this disclosure is a data structure that represents one or more a quantitative values and/or measures significant terms 116. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. A two-dimensional subspace of a vector space may be defined by any two orthogonal vectors contained within the vector space. A vector's "norm' is a scalar value, denoted $\|a\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

Still referring to FIG. 1, for the purposes of this disclosure a vector is "normalized' if it has been turned into a vector of length 1, or "unit vector" by scalar-multiplying the vector with the multiplicative inverse of its norm. In other words, a vector is normalized by the formula $$\frac{a}{\|a\|}.$$

In an embodiment, and with continued reference to FIG. 1, each unique extracted and/or other language element may be represented by a dimension of a vector space; as a non-limiting example, each element of a vector may include a number representing an enumeration of co-occurrences of the significant term and/or language element represented by the vector with another significant term, and/or language element. Alternatively or additionally, dimensions of vector space may not represent distinct terms, in which case elements of a vector representing a first term may have numerical values that together represent a geometrical relationship to a vector representing a second term, wherein the geometrical relationship represents and/or approximates a semantic relationship between the first term and the second term. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally or alternatively, degree of similarity may include any other geometric measure of distance between vectors.

Still referring to FIG. 1, the plurality of vectors 120*a-m* in a vector space represents a plurality of semantic relationships 124. As used in this disclosure "semantic relationships" are relationships between the plurality of significant terms 116 and a plurality of semantic units 128 in corpus of documents 112. As a non-limiting example, semantic relationships 124 may include associations between the meanings of phrases, sentences, paragraphs, essays, novels, and/or written documents. Additionally and/or alternatively semantic relationships 124 may include, without limitation, synonymy, antonymy, homonymy, polysemy, and/or metonymy. As used in this disclosure "semantic units" are words, phrases, sentences, and/or "n-grams" of words, defined as a set of n words appearing contiguously in a text. As a non-limiting example, semantic units may include one or more words, wherein words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data. Textual data may be parsed into tokens, which may include a simple word (sequence of letters separated by whitespace) or more generally a sequence of characters as described previously, as delineated by one or more separating characters such as spaces, punctuation or the like. The term "token," as used herein, refers to any smaller, individual groupings of text from a larger source of text; tokens may be broken up by word, pair of words, sentence, or other delimitation. These tokens may in turn be parsed in various ways. Textual data may be parsed using tokens into semantic units such as words or sequences of words as described above. Any or all possible sequences of tokens or words may be stored as "chains", for example for use as a Markov chain or Hidden Markov Model, to generate semantic units.

Computing device 104 may represent semantic relationships 124 by generating a matrix. As used in this disclosure "matrix" is a rectangular array or table of numbers, symbols, expressions, vectors, and/or representations arranged in rows and columns. For instance, and without limitation, matrix may include rows and/or columns comprised of vectors representing terms, where each row and/or column is a vector representing a distinct term; terms represented by vectors in matrix may include all semantic units as described above as derived from corpus, including without limitation significant terms as described above. As a non-limiting example matrix may include semantic relationships associated with abuse, neglect, violence, child support, lack of education, and the like thereof. Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{m \times n} = U_{m \times m} S_{m \times n} V_{n \times n}^T$$

Still referring to FIG. 1, singular value decomposition function may find eigenvalues and eigenvectors of $AA^T$ and $A^T A$. The eigenvectors of $A^T A$ may include the columns of $V^T$, wherein the eigenvectors of $AA^T$ may include the columns of U. The singular values in S may be determined as a function of the square roots of eigenvalues $AA^T$ or $A^T A$, wherein the singular values are the diagonal entries of the S matrix and are arranged in descending order. Singular value decomposition may be performed such that a generalized inverse of a non-full rank matrix may be generated.

Still referring to FIG. 1, computing device 104 may train neural network 108 by performing named entity recognition as a function of corpus of documents 112. As used in this disclosure "named entity recognition" is a subtask of information extraction that seeks to locate and classify named entities mentioned in unstructured text into pre-defined categories. Pre-defined categories may include, without limitation, categories such as person names, organizations, locations, medical codes, time expressions, quantities, monetary values, percentages, and the like thereof. In an embodiment, one or more categories may be enumerated, to find total count of mentions in such documents. Computing device 104 may configure neural network to performed named entity recognition by extracting, from one or more documents in document sequence, one or more words and/or other semantic units. As a non-limiting example, neural network 108 may perform named entity recognition to at least compare extracted significant terms to semantic units.

Still referring to FIG. 1, neural network 108 may perform named entity recognition by producing a language processing model. Language processing model may include a program automatically generated by computing device 104 and/or named entity recognition to produce associations between one or more significant terms extracted from corpus of documents 112 and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in corpus of documents 112 constitutes a positive or negative indicator may be determined, in an embodiment, by mathematical associations between detected significant terms, comparisons to phrases and/or words indicating positive and/or negative indicators that are stored in memory at computing device, or the like.

Still referring to FIG. 1, computing device 104 may generate the named entity recognition by any suitable method, including without limitation a natural language processing classification algorithm; language processing model may include a natural language process classification model, for instance as generated by training neural network, that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMIs as used herein are statistical models with inference algorithms that that may be applied to the models. In such models, a hidden state to be estimated may include an association between semantic elements such as terms, phrases, tokens, etc. There may be a finite number of categories to which an extracted word may pertain; an HMM inference algorithm, such as the forward-backward algorithm or the Viterbi algorithm, may be used to estimate the most likely discrete state given a word or sequence of words. Computing device 104 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

In an embodiment, and still referring to FIG. 1, computing device 104 may train neural network 108 using multi-task learning. As used herein, multi-task learning (MTL) is a subfield of machine learning in which multiple learning tasks are solved at the same time, while exploiting commonalities and differences across tasks. This may result in improved learning efficiency and prediction accuracy for the task-specific models, when compared to training models separately.

Figure 2:
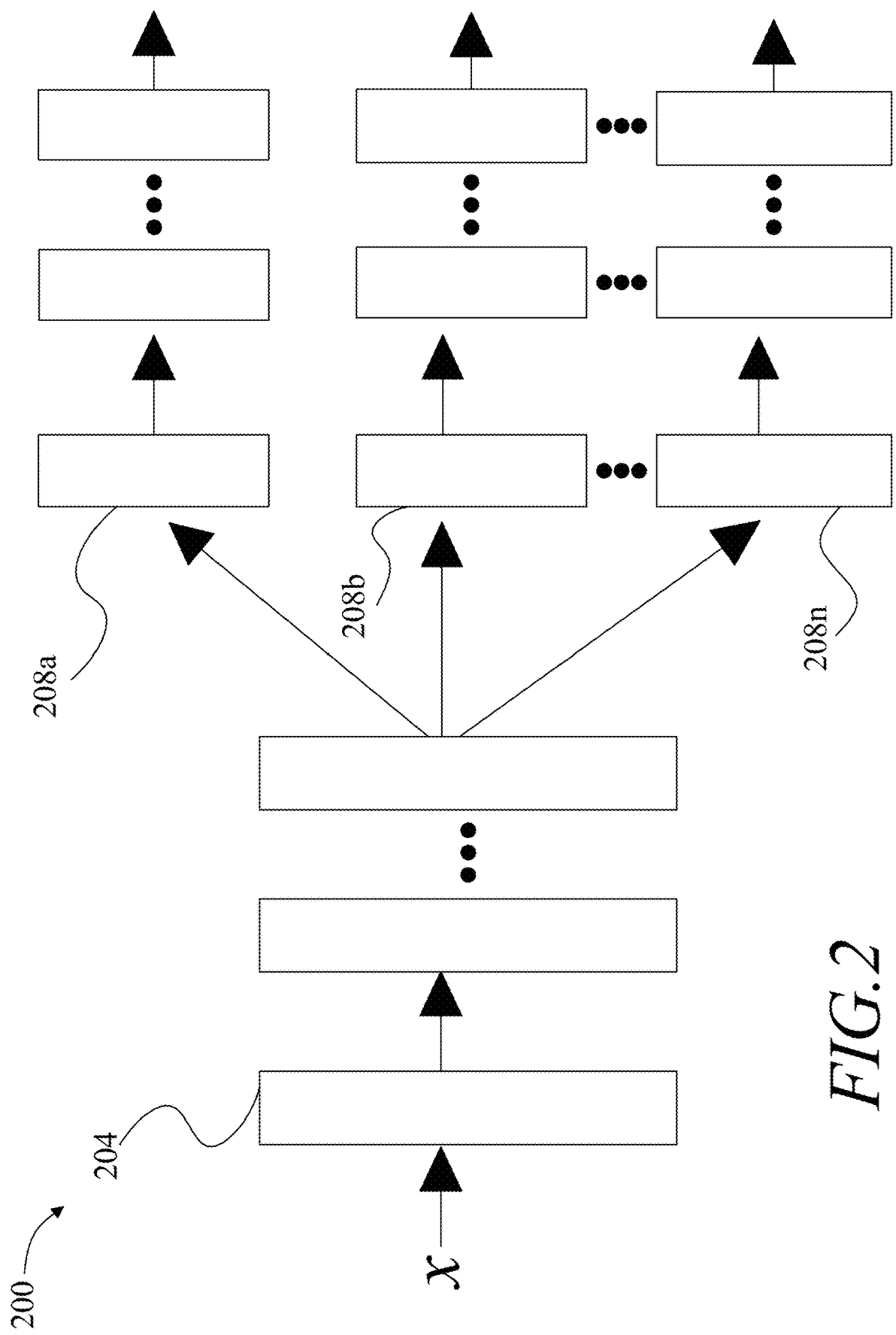
FIG. 2 is a block diagram illustrating an exemplary embodiment of architecture for multi-task learning.

Referring now to FIG. 2, an exemplary architecture 200 for multi-task learning is illustrated. Multi-task learning may be performed with a base network 204 and a plurality of task-specific sub-networks 208a-n. An input x may pass through base network 204. An output of base network 204 may is copied and/or otherwise distributed to individual sub-networks 208a-n. Each sub-network of plurality of sub-networks 208a-n may perform a specific task of the multiple tasks performed by MTL process. Parameters in base network 204 may be shared between tasks to be performed using sub-networks 208a-n, while the sub-networks 208a-n may contain unique parameters for each task. Each of base network 204 and sub-networks 208a-n may be implemented in any form suitable for any neural network described in this disclosure, and may be trained with any training data, using any training methodology, described in this disclosure. Base network 204 and sub-networks 208a-n may be trained simultaneously. As a non-limiting example, input x may be a progress note, and sub-networks may perform tasks of (1) language modeling, (2) named entity recognition, (3) risk/protective factor and social determinants of health classification, and (4) component classification.

Figure 3:
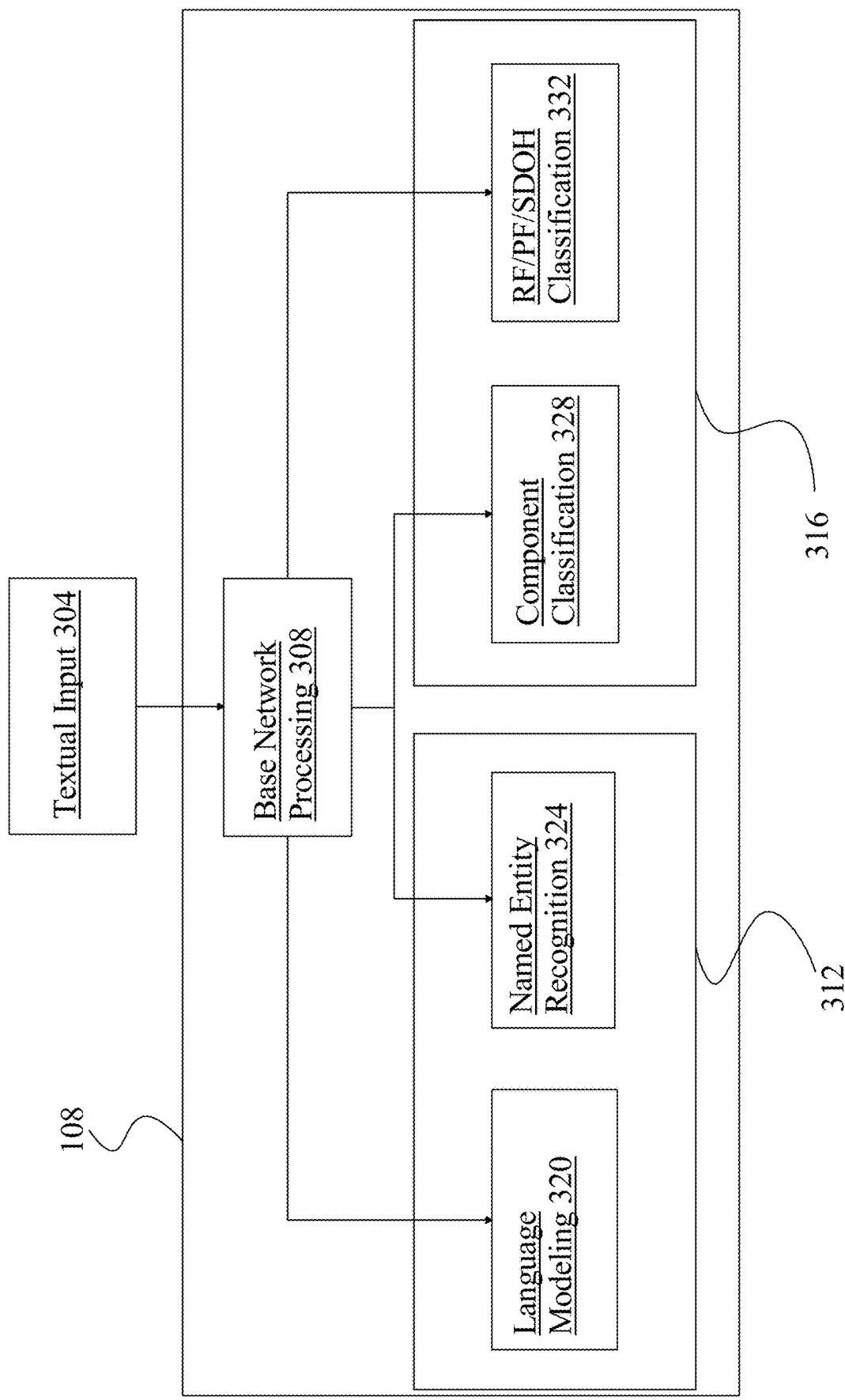
FIG. 3 is a block diagram illustrating an exemplary embodiment of a process flow of tasks to be performed by a neural network.

Referring to FIG. 3, an exemplary embodiment of a process flow 300 of tasks to be performed by a neural network such as neural network 108 according to an MTL process is illustrated. A textual input 304 such as a document from a current document sequence as described below may be received by neural network 108. Computing device 104 may tokenize textual input 304 prior to provision to base network 204. Tokenization may be performed in any manner that may occur to a person skilled in the art upon reading the entirety of this disclosure; for instance, computing device 104 may split long strings into words, sub-words and other semantic units to feed into neural network 108. In embodiments, special tokens may be used to denote a beginning and end of each sentence. This step may enable sentence classification sub-networks and provide the model with additional information about the sentence structure of a textual input 304. As a non-limiting example, a note that reads "There is a history of domestic violence (DV). This problem is exacerbated by the caretaker's recurring substance use" may be split into the following sentences: "There is a history of domestic violence (DV)"; "This problem is exacerbated by the caretaker's recurring substance use." Continuing the example, the input may be tokenized note with start (<s>) and end (</s>) sentence tokens "<s>" may produce tokens: "There", "is", "a", "history", "of", "domestic", "violence", "(", "D", "V", ")", "</s>", "<s>", "This", "problem", "is", "exacerbated", "by", "the", "care", "taker", "'s", "recurring", "substance", "use", ".", "</s>".

Further referring to FIG. 3, base network 204 may perform base network processing 308 to return an output embedding for each token and/or semantic unit within textual input 304. Each embedding may capture information about a token and/or other semantic unit and its context such as tokens and/or semantic units in textual input 304 and/or corpus, for instance and without limitation as described in this disclosure.

In an embodiment, and still referring to FIG. 3, some sub-network processing may include token-level classification 312, which may classify tokens to outputs of interest, and/or sentence-level classification 316, which may classify sentences to outputs of interest. Token-level processing 312 may include, as a non-limiting example, language modeling 320, which may be performed by a sub-network as described above. Language modeling 320 may involve learning a probability distribution over a sequence of words, which probability distribution may be used to characterize relationships between words, for instance and without limitation as captured by geometric relationships between vectors as described in this disclosure. During training, a first proportion such as 15% of tokens in a textual input may be replaced with a special mask token, a second proportion such as 10% may be replaced with a random token, and/or remaining tokens may be kept the same. A task in training may be to predict an original masked token; in other words, the following example may be a "fill in the blank" or Cloze Test: "Today, I went to the and bought some milk and eggs. I knew it was going to rain, but I forgot to take my _____, and ended up getting wet on the way." An output embedding from a base network 204 may be used by a classification sub-network for this prediction. Only masked tokens in a note may contribute to a loss function which influences how to change network parameters to improve performance. A model being trained may learn which tokens appear in a similar context for a given dataset. This may mean that an underlying output embedding from base network 204 may be capturing similarities between words that typically appear. Thus, base network 204 may be trained on a first set of text, while language modeling 320 may be performed with a different corpus, resulting in a different and/or modified probability distribution and/or set of relationships, which may be specific to a particular subject area and/or entity or agency. As a non-limiting example, a resulting model may be catered towards clinically-specific text and language used by case workers. Model may be able to learn slang, acronyms, synonyms, misspellings, jargon, and more which may be otherwise absent from generalized models.

With further reference to FIG. 3, token-based classification 312 may include named entity recognition 324. Like language modeling, this may occur at a token level yet an entity may span over multiple tokens. Each token in a note may be annotated using beginning-inside-outside (BIO) notation and/or tagging. In BIO notation, a "B" may denote a start of an entity, an "I" may represent a continuation of an entity, and an "O" may represent non-entity tokens. This setup may penalize each token inference individually in a loss function and include a possibility of partial detections. Considering an output embedding from base network 204 may include information about a current token as well as surrounding tokens, a named entity recognition 324 sub-network may make inferences based on context around a name and not just the name itself. Even if a name is masked during training, a resulting model may still know a name normally goes in a place like this. For the same reason, it is possible to correctly identify entities never seen before. Although this sub-network may contain separate parameters from a language modeling sub-network, both networks may be influencing parameters of shared base network 204 model. This may force base network 204 model to learn a representation conducive for high performance in both tasks.

Continuing to refer to FIG. 3, sentence-level classification 316 may include component classification 328. Component classification 328 may include classification of sentences into categories belonging to the components as described above. All tokens within textual input 304 may have a unique output embedding from base network 204. In order to classify a single sentence within a note, a component sub-network may combine information from all tokens within a particular sentence. For instance, and without limitation, component sub-network may, for each sentence: 1. Grab all output embeddings from base network between start <s> and end </s> sentence tokens; 2. Pass each embedding through a linear layer; 3. Perform max pooling over all outputs from the previous linear layer to get a single embedding representing the full sentence; and 4. Pass this sentence embedding through another linear layer for classification. During training, if a sentence is labeled with a component, it may contribute to a loss function used in training. Sentences without labels may be ignored by this sub-network. In this sense, sentences that should be labeled but are missed by weak labeler may not harm the model during training; they simply may not help. Key words or phrases used by weak labeler may have a chance of being masked during training; as a result, sub-network may be configured to correctly classify a sentence even without the most crucial piece of information. This may be possible by using information in a surrounding context of a masked term. For this reason, a model may still learn to output the correct classification even for unlabeled sentences missed by a weak labeler. Although these sentences may contain variations beyond those specified by the weak labeler, their context may be typically similar. Unlike previous token-level tasks, a sentence may contain multiple components making this a multi-label classification problem.

Still referring to FIG. 3, sentence-level classification 316 may include RF/PF/SDOH classification, which may classify sentences into categories belonging to risk/protective factors and social determinants of health. This process may be implemented in any manner suitable for implementation of a component sub-network. Both component and RF/PF/SDOH sub-networks may help guide the base network 204 representation to work well with sentence classification here considering tasks may all be related.

In an embodiment, and referring again to FIG. 1, computing device 104 may produce a query element as a function of neural network 108. As used in this disclosure "query element" is a graphical control element comprising a search field and/or search bar. As a non-limiting example, query element may include a search relating to all documents associated with sexual assault. As a further non-limiting example, query element may include a search relating to all documents associated with a particular time metric such as a particular day, month, and/or year. Computing device 104 may produce query element by generating a concatenation database. As used in this disclosure database may include a database of previous document sequences that includes particular groupings by category, entities, case histories, and the like thereof. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, concatenation database may be generated as a function of a k-nearest neighbors' algorithm and corpus of documents 112. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. Search algorithms using queries as described in this disclosure may use K-nearest neighbors index matching as a sole basis for returning search results, and/or may combine such matching, or substitute it, with one or more other methods and/or processes as described in this disclosure.

Still referring to FIG. 1, embodiments described herein may provide users with functionality to consume and navigate notes within a particular case via tagged sentences and named entities. Users may be able to search between individual cases as represented by document sequences. Depending on user permissions, queries may be set up to search over all cases for a particular worker, all cases within a program, and/or all cases belonging to any other organizational structure provided by an agency. Queries may include any query as described in this disclosure, including without limitation any Boolean combination of sentence categories belonging to a sentence taxonomy in this disclosure, date ranges, and/or keyphrase matching. A query result may include one or more links or buttons, such as a "See Cases" button which may bring up all cases satisfying a query. As a non-limiting example, a query for "DV & No OOP" may cause retrieval cases involving domestic violence with no order of protection in place or being sought.

In a listing of results, a user may be able to select a "Go to case" or other link to visit a case overview tab. While viewing a particular case, clicking a "quality alerts" tab may display all queries appearing within the particular case as seen; queries may be aggregated overtime and show graphs that demonstrate the prevalence of returned terms over a given period.

Still referring to FIG. 1, computing device may be configured to perform semantic search, denoting search with meaning, as distinguished from lexical search where a search engine looks for literal matches of the query words or variants of them, without understanding the overall meaning of the query. Semantic search may seek to improve search accuracy by understanding a searcher's intent and a contextual meaning of terms as they appear in a searchable dataspace, whether on the Web or within a closed system, to generate more relevant results. Content that ranks well in semantic search may be well-written in a natural voice, focuses on the user's intent, and considers related topics that the user may look for in the future. In an embodiment, neural network 108 may provide an embedding for every token and/or semantic element within a note or other document capturing information related to all sub-tasks used during training, including without limitation language modeling, named entity recognition, and/or sentence classification. A word and/or phrase level embedding may be created by taking the average embedding of all tokens within the word/phrase. All embeddings for overlapping n-grams up to some value of n, such as without limitation n=5 may be stored in an elastic search database. Any new phrase, which may get its own embedding based on average embeddings of tokens within the phrase, can be used for a semantic search. A search may be performed at a case level, in a non-limiting example, and may return all n-grams with a cosine similarity value above a desired threshold. This search functionality may be used in combination with any other search and/or filtration processes and/or protocols described in this disclosure, including without limitation note filtering functions for sentences, people, and/or queries.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Computing device 104 may determine a vector similarity as a function a query term, wherein a "query term" is the text, symbol, and/or term entered as a query element. As used in this disclosure a "vector similarity" is a similarity between two or more vectors with respect to the magnitudes, inequalities, angle, area, and/or volume differences among the two or more vectors. Vector similarity may be measured according to any norm for proximity and/or similarity of two vectors, including without limitation cosine similarity, wherein cosine similarity is a measure of similarity between two-non-zero vectors of a vector space, wherein determining the similarity includes determining the cosine of the angle between the two vectors, as described in detail above.

Still referring to FIG. 1, computing device receives a current document sequence 132. As used in this disclosure a "current document sequence" is a collection of texts, recordings, and/or representations that disclose a current and/or novel document sequence. A current document sequence may be received in a single batch of one or more documents, and/or may be received a portion at a time, with additional documents updated as they become available; for instance, new notes or other entries in a case history may be added after one iteration of one or more methods or method steps as described in this disclosure, which may be processed in a subsequent iteration and/or prompt a subsequent iteration. As a non-limiting example, current document sequence 132 may include texts, recordings, and/or representations associated with a specific child welfare case, medical case, social worker case, and the like thereof. Additionally or alternatively, current document sequence 132 may include video recordings, audio recordings, and/or third-party input. Current document sequence 132 includes a plurality of documents in a sequential order 136. As used in this disclosure "sequential order" is a logical structure of current document sequence 132. As a non-limiting example, sequential order 136 may identify documents based on a time metric, wherein a time metric may include seconds, minutes, hours, days, weeks, months, years, and the like thereof. For example, and without limitation sequential order 136 may include case notes that are organized according to the chronological sequence of the annual calendar. As a further non-limiting example, sequential order 136 may order documents as a function of a named entity. For example, and without limitation, current document sequence 132 may be ordered such that only documents containing the named entity "Dad" are displayed.

Still referring to FIG. 1, computing device maps a plurality of mapped terms 140. As used in this disclosure "mapped terms" are words and/or phrases in current document sequence 132 that are closely related to significant terms 116, for instance and without limitation as represented by a close geometric relationship between vectors representing mapped terms and significant terms. As a non-limiting example, mapped terms 140 may include mapping terms such as brother and/or sister to significant terms such as abuse and/or assault. As a further non-limiting example, mapped terms 140 may include terms such as childcare and family service. Mapped terms 140 include mapping of the plurality of significant terms 116 to the plurality of documents as a function of neural network 108 and the plurality of vectors 120*a-m*. Computing device 104 may map the plurality of mapped terms 140 by tokenizing current document sequence 132. Current document sequence 132 may be tokenized according to the tokenizing process as described above, in detail. Computing device 104 may parse current document sequence 132 into a plurality of current semantic units as a function of significant terms 116. As used in this disclosure "current semantic units" semantic units present in current document sequence 132 that represent a noun, pronoun, verb, adjective, adverb, preposition, conjunction, and the like thereof, as described above in detail.

Still referring to FIG. 1, computing device 104 may obtain vectors representing current semantic units in vector space as a function of the plurality of current semantic units and neural network 108. Documents in current document sequence may be tokenized using any process and/or protocol for tokenization and/or sentencization as described above. As a non-limiting example, a current semantic unit of unsafe child areas may be identified and inputted to neural network 108, wherein neural network 108 may output a vector containing a particular magnitude and/or direction in the n-dimensional vector space and/or elements thereof may be scaled according to relative frequencies of appearance and/or file sizes. As a non-limiting example, neural network 108 may output a magnitude and/or direction of a vector as a function of a term frequency-inverse document frequency. As used in this disclosure a "term frequency-inverse document frequency" is a numerical statistic that represents the significance of a word and/or current semantic unit in current document sequence 132. In an embodiment term-frequency-inverse document frequency may include a weighting factor that aids in information retrieval, text mining, and/or user modeling. As a non-limiting example term frequency-inverse document frequency may increase proportionality to the number of times a word appears in the document, wherein it is offset by the number of documents in current document sequence 132 that contain a current semantic unit. In an embodiment, term frequency-inverse document frequency may deterring the numerical statistic according to a term frequency, tf(t, d), and an inverse document frequency, idf(t, D), according to the function $$tfidf(t,d,D,)=tf(t,d)\cdot idf(t,D).$$

Still referring to FIG. 1, a "term frequency", as used in this disclosure, is a raw count of a current semantic unit in the current document sequence and may be defined, as a non-limiting example, according to a term frequency adjusted for document length, tf(t,d), as $$tf(t, d) = 0.5 + 0.5x \frac{f_{t,d}}{\max\{f_{t',d} : t' \in d\}}.$$

Still referring to FIG. 1, as "inverse document frequency", as used in this disclosure, is a measure of how much information the word, term, and/or current semantic unit provides and may be defined, as a non-limiting example, according to the logarithmically scaled inverse fraction of the documents that contain the word, term, and/or current semantic unit as $$idf(t, D) = \log \frac{N}{|\{d \in D : t \in d\}|}.$$

Still referring to FIG. 1, computing device 104 may associated current semantic units to significant terms 116 as a function of a vector relationship model. As used in this disclosure "vector relationship model" is an algorithm that identifies a relationship between two or more vectors with respect to the magnitudes, inequalities, angle, area, and/or volume differences among the two or more vectors. Vector relationship model may include computing a degree of vector similarity between a vector representing each current semantic unit and a vector representing significant terms 116; vector similarity may be measured according to any norm for proximity and/or similarity of two vectors, including without limitation cosine similarity, wherein cosine similarity is described above, in detail.

Still referring to FIG. 1, computing device 104 generates a plurality of timelines 144 as a function of sequential order 136 and the plurality of mapped terms 140. As used in this disclosure "timelines" are graphical representations of the passage of time as represented on a line. Plurality of timelines 144 may be represented on a graphical user interface that allows a user to review the current document sequence in the timeline of the plurality of timelines according to a significant term. Plurality of timelines 144 may include a representation of one or more significant terms as a function of a time metric, wherein a time metric is seconds, minutes, hours, days, months, years, and the like thereof. For example, and without limitation a first timeline may include a timeline associated with current document sequence 132 relating to the significant term of abandonment, wherein a second timeline may include a timeline associated with current document sequence 132 relating to the significant term of abuse. In an embodiment each significant term of the plurality of significant terms may be linked to a corresponding document and/or location within the document, such that the selection of the significant term opens a timeline of documents associated with that term. As a non-limiting example, selection of a single document as a result of the generated timeline opens a document of current document sequence 132 in the location of the term, providing context for the term in the generated timeline. Additionally or alternatively, computing device 104 may produce a named entity timeline as a function of the named entity recognition and current document sequence 132. As used in this disclosure "named entity timeline" is a graphical representation of linearity of the passage of time as a function of a named entity. As a non-limiting example, a named entity of "Uncle Buck" may include documents that are associated with a first year in a child welfare case, wherein documents containing the named entity "Uncle Buck" do not appear again until the third year in a child welfare case.

Still referring to FIG. 1, computing device 104 may generate the plurality of timelines 144 by establishing a categorical element. As used in this disclosure a "categorical element" is an element relating to a category and/or classification of a current document sequence. As a non-limiting example categorical element may include categories including drugs, abuse, abandonment, foster case, behavioral modifications, illegal activities, and the like thereof. For example, and without limitation, a timeline may be generated as a function of a child welfare case, wherein a first timeline may relate to drugs being present with the child, wherein a second timeline may be generated that relates to abandonment of the child. Additionally or alternatively, categorical element may be established by grouping categories together that fall within a threshold degree of similarity. As used in this disclosure "threshold degree of similarity" is a limit and/or level that is required for similarity of two or more mapped terms. For example, and without limitation a threshold degree of similarity may be set to 0.85 to generate a category of verbal abuse. As a further non-limiting example categorical element may identify significant terms as belonging to the category, wherein each significant term is represented by vectors within threshold distances from additional significant term vectors in that category. In an embodiment vectors associated with significant terms "Aunt Lisa", "excessive", and "unwanted" may all exceed the threshold degree of similarity for the category of verbal abuse. Additionally or alternatively, categorical element may be established as a function of a degree of variance from a vector centroid, average, and/or direction of vectors representing significant terms within the category. As used in this disclosure a "degree of variance" is a quantitative value comprising the magnitude of divergence of a degree of similarity. For example, and without limitation, a degree of variance may distinguish that a vector similarity needs to be greater than 0.95 to be categorized with the significant term of interest. As a further non-limiting example, a degree of variance may distinguish that a vector similarity needs to be less than 0.05 to establish a new category that is different from the previous significant terms.

In an embodiment, and still referring to FIG. 1, computing device 104 may generate timeline 144 as a function of the significant terms in current document sequence 132. As a non-limiting example, the term "Uncle John" may appear in the first 10 documents of current document sequence as well as the last 2 documents of current document sequence, wherein timeline 144 may be generated as a function of the documents that only encompass "Uncle John" in the document. Additionally or alternatively, timeline 144 may be generated as a function of the order of terms in current document sequence 132. As a non-limiting example terms including "assault", "abuse", and "Mom" may result in a timeline of documents ordered according to the significant terms.

Still referring to FIG. 1, computing device 104 may include a search window as a function of the concatenation database and current document sequence 132. As used in this disclosure a "search window" is a location in the graphical user interface that allows a user to enter text, symbols, representations, and the like thereof, wherein the entered information searches across both the concatenation database and current document sequence 132. A user may enter information into search window, wherein computing device 104 may return document sequences from both current document sequence 132 as well as the concatenation database that contain the entered search information and/or semantic units that have a pre-determined limit associated with the degree of similarity to the entered information, wherein a degree of similarity is described above in detail. As a non-limiting example, a user may enter "students that sell marijuana", wherein search results may include search results with the terms "students that sell marijuana", "hashish transactions among undergraduates", "Sale of kush in scholastic settings", and the like thereof.

Still referring to FIG. 1, computing device 104 may display on the graphical user interface the documents that include the significant terms, similar semantic units, and/or named entities common to two or more document sequences. In an embodiment, computing device 104 may determine a common named entity in two or more documents from either current document sequence 132 and/or corpus of documents 112. For instance, and without limitation, computing device 104 may generate a timeline of similar named entities, wherein the search window presents the plurality of document sequences as a function of the named entity recognition. Additionally or alternatively, search window may display generated timelines as a function of the entered search information, the named entity, and/or the categorical element. The search window may display the plurality of generated timelines and allow for a user to select a timeline of the plurality of timelines, such that the timeline displays the documents in that sequence of documents. Additionally or alternatively, the selected timeline may open documents that relate to the entered search information to allow the user to read the search information in context.

Figure 4:
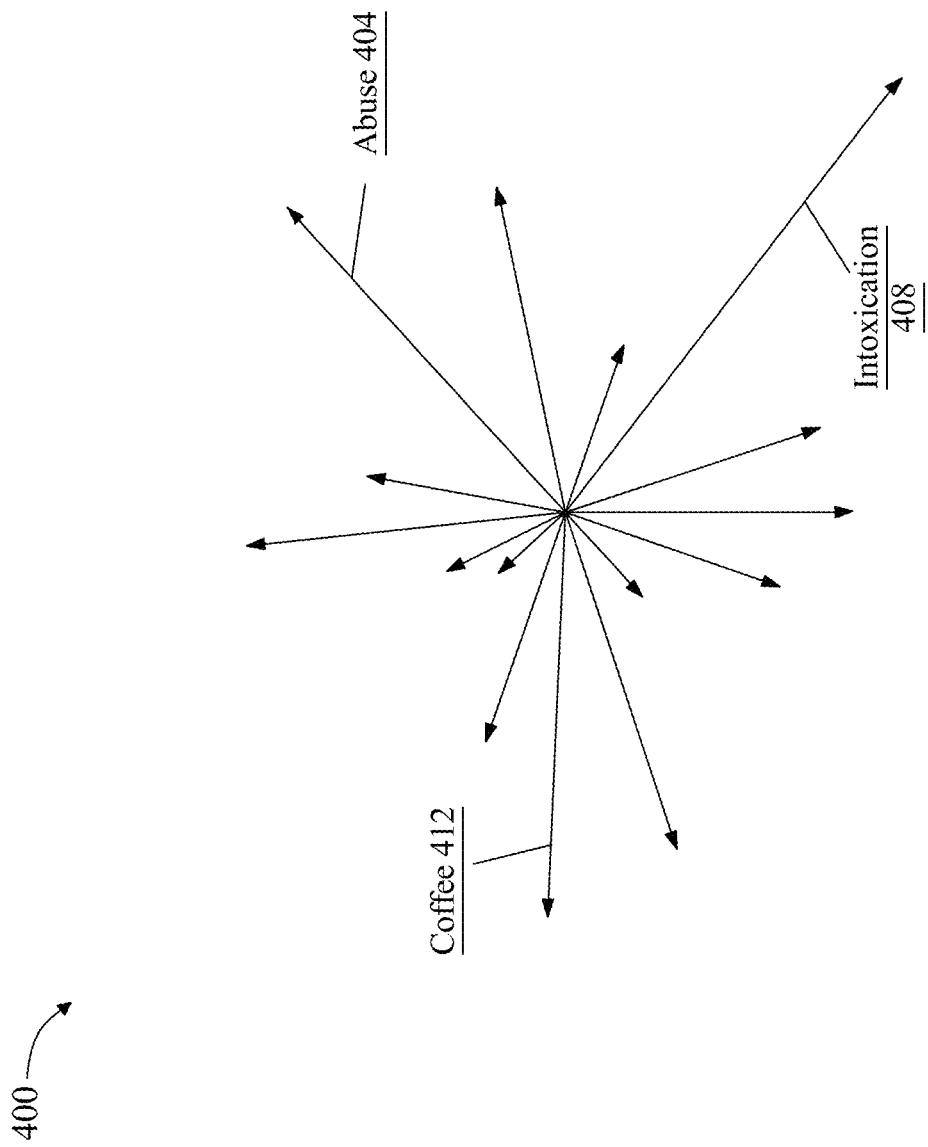
FIG. 4 is a schematic diagram illustrating an exemplary embodiment of a vector space representing semantic relationships according to an embodiment of the invention.

Now referring to FIG. 4, an exemplary embodiment of a vector space representing semantic relationship 124 according to an embodiment of the invention is illustrated. As a non-limiting example a two-dimensional picture of a vector space that disclosed the method might produce the vectors corresponding to the word "abuse" 404 and the word "intoxication" 408 are fairly close together, reflecting the relatively high likelihood that the vectors representing the terms abuse and intoxication would appear together in a written text: each represents a physical action and abuse and intoxication are often occurring during the same event. The vector corresponding to the term "coffee", 412 on the other hand, is pointing in nearly the opposite direction from the vectors "abuse" 404 and "violence" 408. This reflects that, at least in the text underlying this vector space, coffee is not often the subject of a sentence, paragraph, or document discussing abuse and intoxication. The words are not closely associated, and thus the vectors are far apart.

Figure 5:
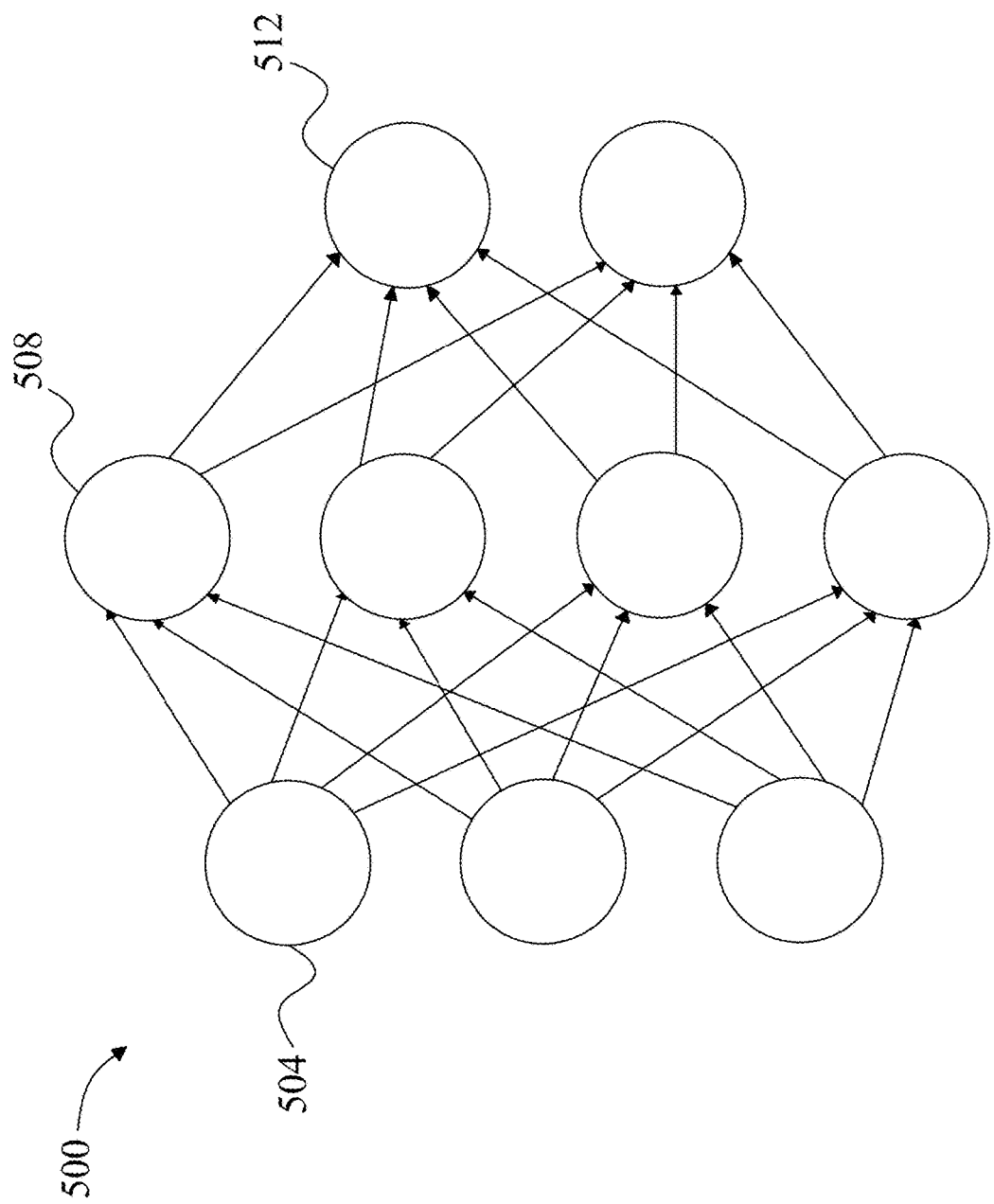
FIG. 5 is a block diagram illustrating an exemplary embodiment of a neural network.

Referring now to FIG. 5, an exemplary embodiment of neural network 108 is illustrated. Neural network 108 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 6:
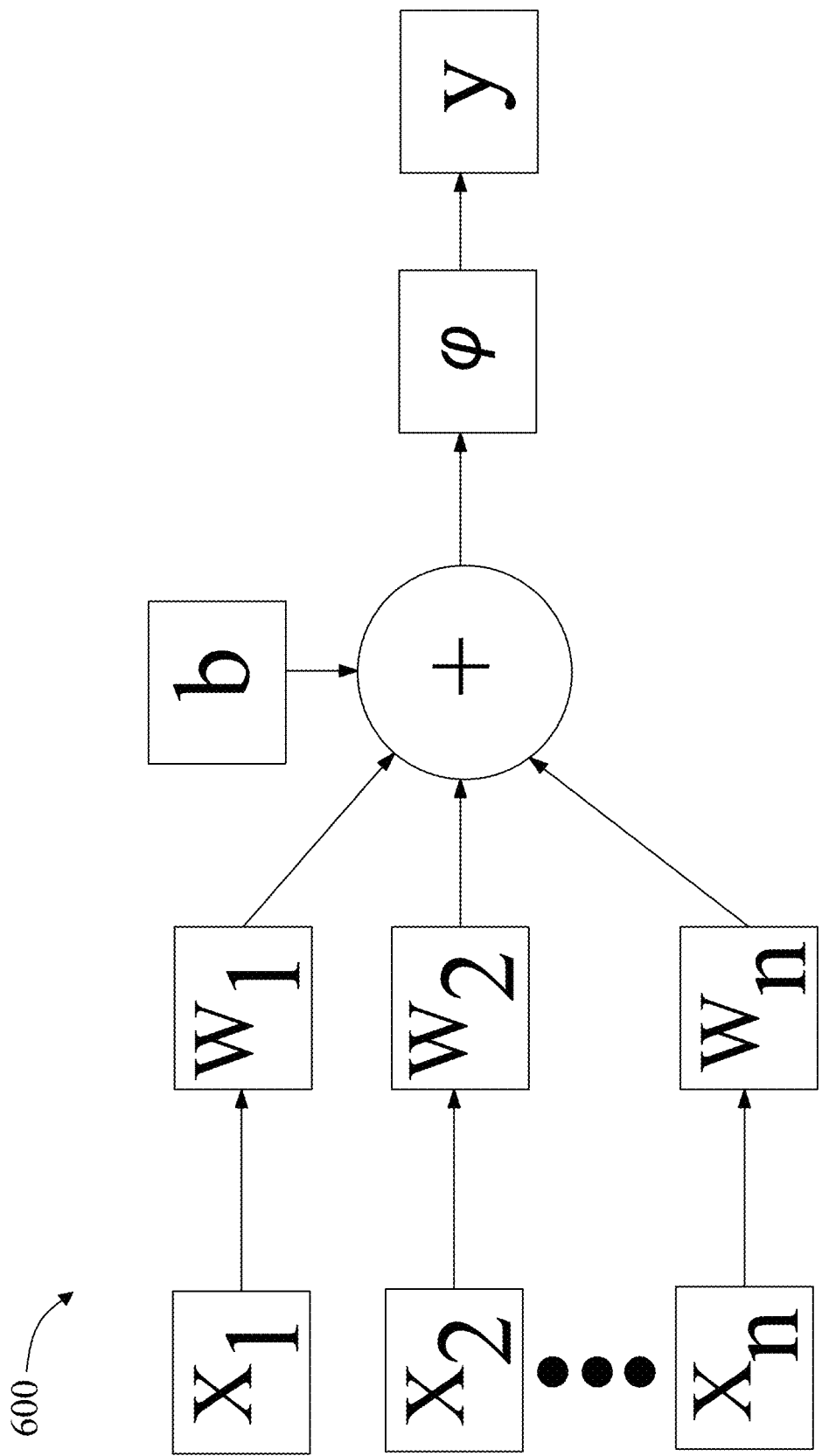
FIG. 6 is a block diagram illustrating an exemplary embodiment of a node in a neural network.

Referring now to FIG. 6, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 6, a neural network may receive semantic units as inputs and output vectors representing such semantic units according to weights $w_i$ that are derived using machine-learning processes as described in this disclosure.

Figure 7:
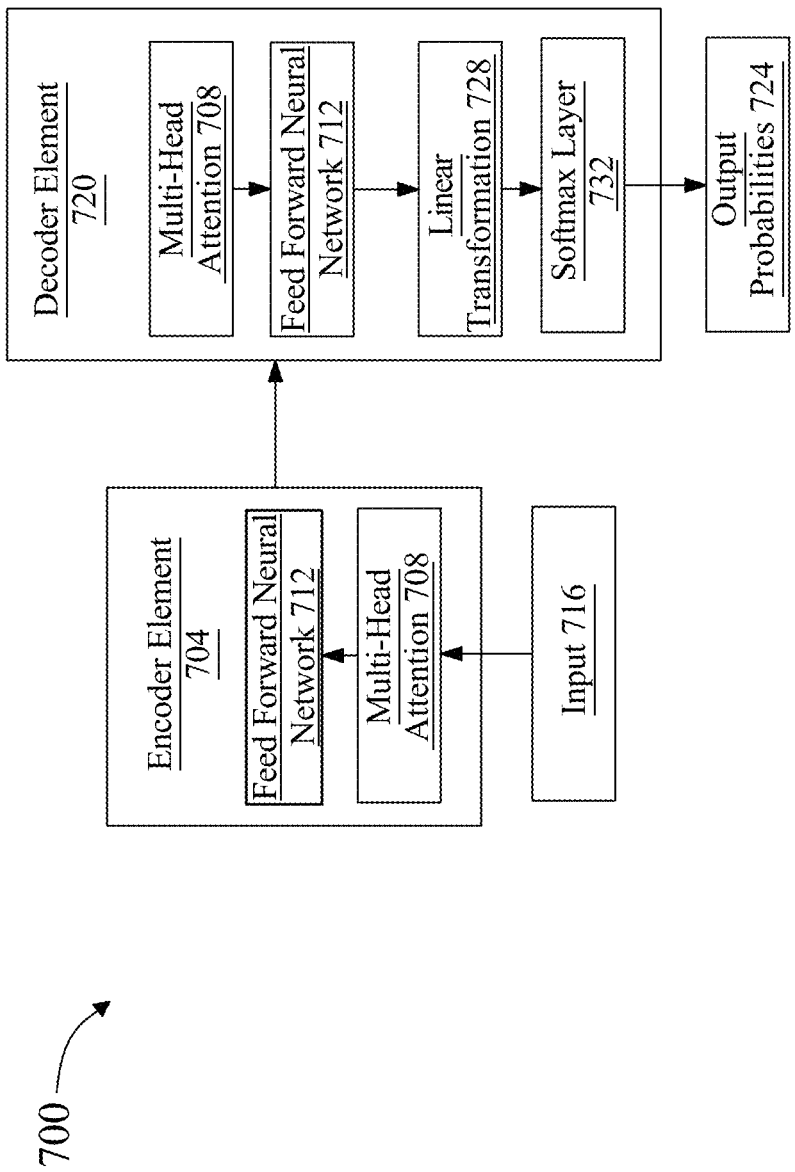
FIG. 7 is a block diagram illustrating an exemplary embodiment of a transformer machine learning model.

Now referring to FIG. 7, an exemplary embodiment 700 of a transformer machine learning model is illustrated. Transformer machine learning model includes an encoder element 704. As used in this disclosure an "encoder element" is an element that encodes inputs. Encoder element 704 may be comprised of a multi-head attention 708 and a feed-forward neural network 712. As used in this disclosure "multi-head attention" is a scaled dot-product attention that establishes a weight for every input in the sequence, such that a relative position in an n-dimensional space is established for an n-dimensional vector of each significant term, word, and/or semantic unit. Multi-head attention may be calculated as a function of a matrix, Q, that contains vector representation of a term in a sequence, a vector representation of all the words in the sequence, K, and the value associated with the values of the vectors that represent all of the words in the sequence, V, according to the function:

$$\text{Attention }(Q, K, V) = \text{softmax}\left(\frac{QK^T}{\sqrt{d_k}}\right)V$$

In an embodiment, and still referring to FIG. 7, multi-head attention 708 may provide weights to vectors such that each word of the sequence, represented by Q, is influenced by all of the other words in the sequence, represented by K. The weights are then normalized to have a distribution between 0 and 1, as described in detail above, in reference to FIG. 1. Multi-head attention 708 may be completed in parallel such that n-dimensional weighted functions may be determined for n-dimensional vectors. Encoder element 704 then transmits the normalized weighted vectors to a feed-forward network 712. As used in this disclosure "feed-forward network" is a network that has identical parameters for each position, such that each normalized weighted vector can be a separate, identical linear transformation of each vector in each sequence. Encoder element 704 first receives an input 716, wherein an "input" is any textual representation, audiographic representation, and/or videographic representation. Input 716 is entered to a multi-head-attention 708 such that encoder 704 produces output encodings that are provided to the next encoder element and/or a decoder element 720. As used in this disclosure a decoder element 720 is an element that decodes the output encodings from encoder element 704 to provide output probabilities 724. As used in this disclosure "output probabilities" are probabilities of a vector interaction and/or similarity with another vector in the vector space. Decoder element 720 may be comprised of multi-head attention 708, feed-forward network 712, and/or an attention mechanism over the encodings. Decoder element 720 functions in a similar fashion to encoder element 704, but an additional attention mechanism is inserted, wherein the attention mechanism draws relevant information from the encodings generated by encoder element 704. Decoder element 720 takes position and/or direction information of the normalized weighted vectors in n-dimensional space and predicts an output sequence. Decoder element 720 includes a linear transformation element 728. As used in this disclosure "linear transformation" is a linear transformation that at least maps two or more vectors in an n-dimensional vector space. Decoder element 720 includes a softmax layer 732. As used in this disclosure "softmax layer" is a generalization of the logistic function to multiple dimensions. Softmax layer 732 may normalize the output of a network to a probability distribution of the decoder element 720 output.

Figure 8:
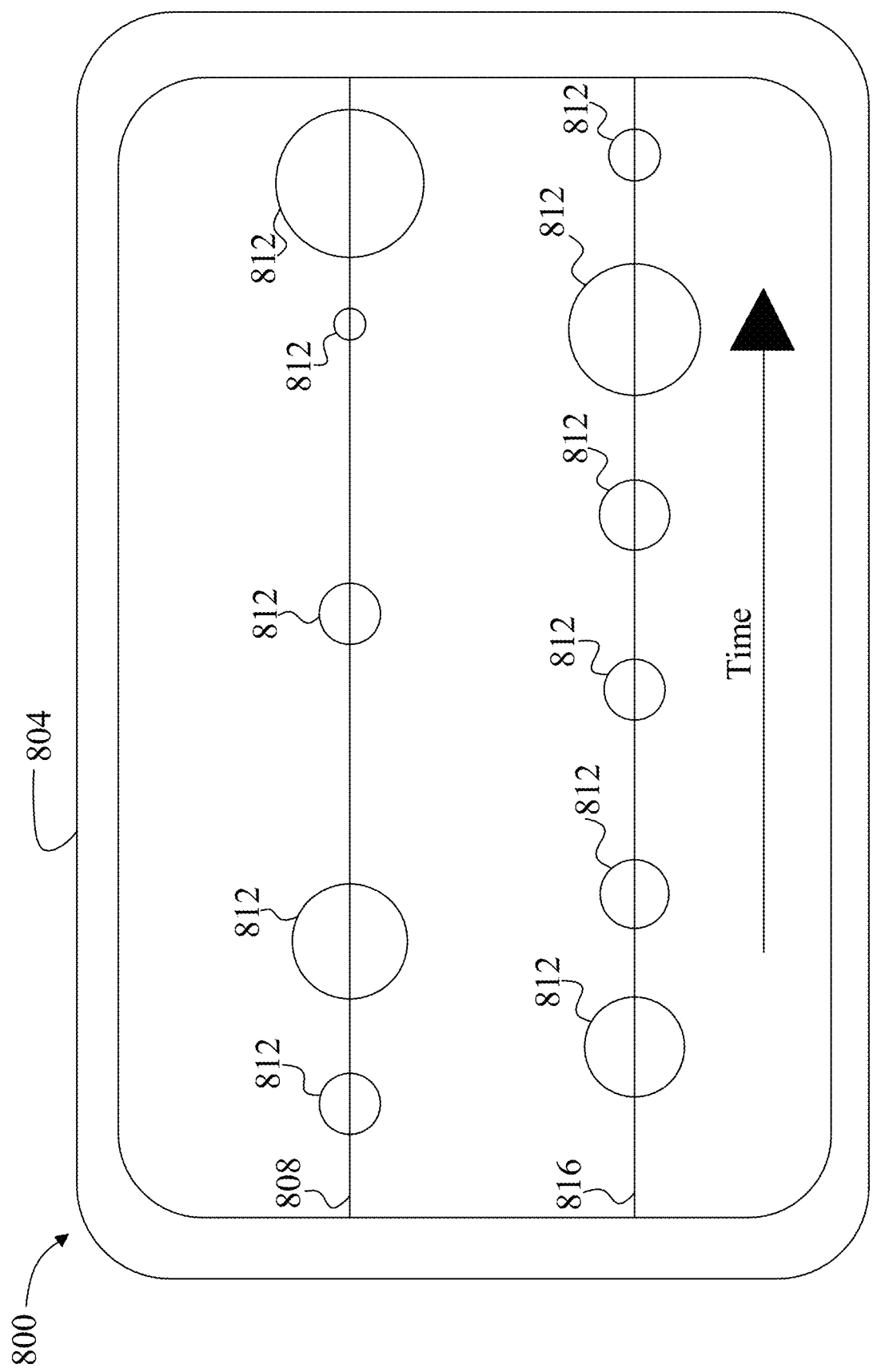
FIG. 8 is a block diagram illustrating an exemplary embodiment of a graphical user interface according to an embodiment of the invention.

Referring now to FIG. 8, an exemplary embodiment 800 of a graphical user interface 804 is illustrated. As used in this disclosure a "graphical user interface" is a visual depiction of a timeline that allows for a user to interact with the computing device using items such as windows, icons, menus, and the like thereof. Graphical user interface 804 may include a first timeline 808. As used in this disclosure a "first timeline" is a timeline associated with a first search term of the plurality of documents in the current document sequence as a function of time. First timeline 808 may include displaying a cluster of documents 812 associated as a function of the first search term. As used in this disclosure a "cluster of documents" is a bundle of documents represented on a timeline as a function of a plurality of search terms that may be selected. Cluster of documents 812 may be selected to allow a user to read individual documents in current document sequence 132 as a function of the search information. As a non-limiting example, the search term "drugs" may generate first timeline 808, wherein cluster of documents 812 may be presented on first timeline 808 representing documents that contain the term "drugs" along the timeline. Graphical user interface 804 may include a second timeline 816. As used in this disclosure a "second timeline" is a timeline associated with a second search term of the plurality of documents in the current document sequence as a function of time. Second timeline 816 may include displaying cluster of documents 820 associated as a function of the second search term. As a non-limiting example, the second search term "abuse" may generate second timeline 816, wherein cluster of documents 812 may be presented on second timeline 816 representing documents that contain the term "abuse" along the timeline.

Figure 9:
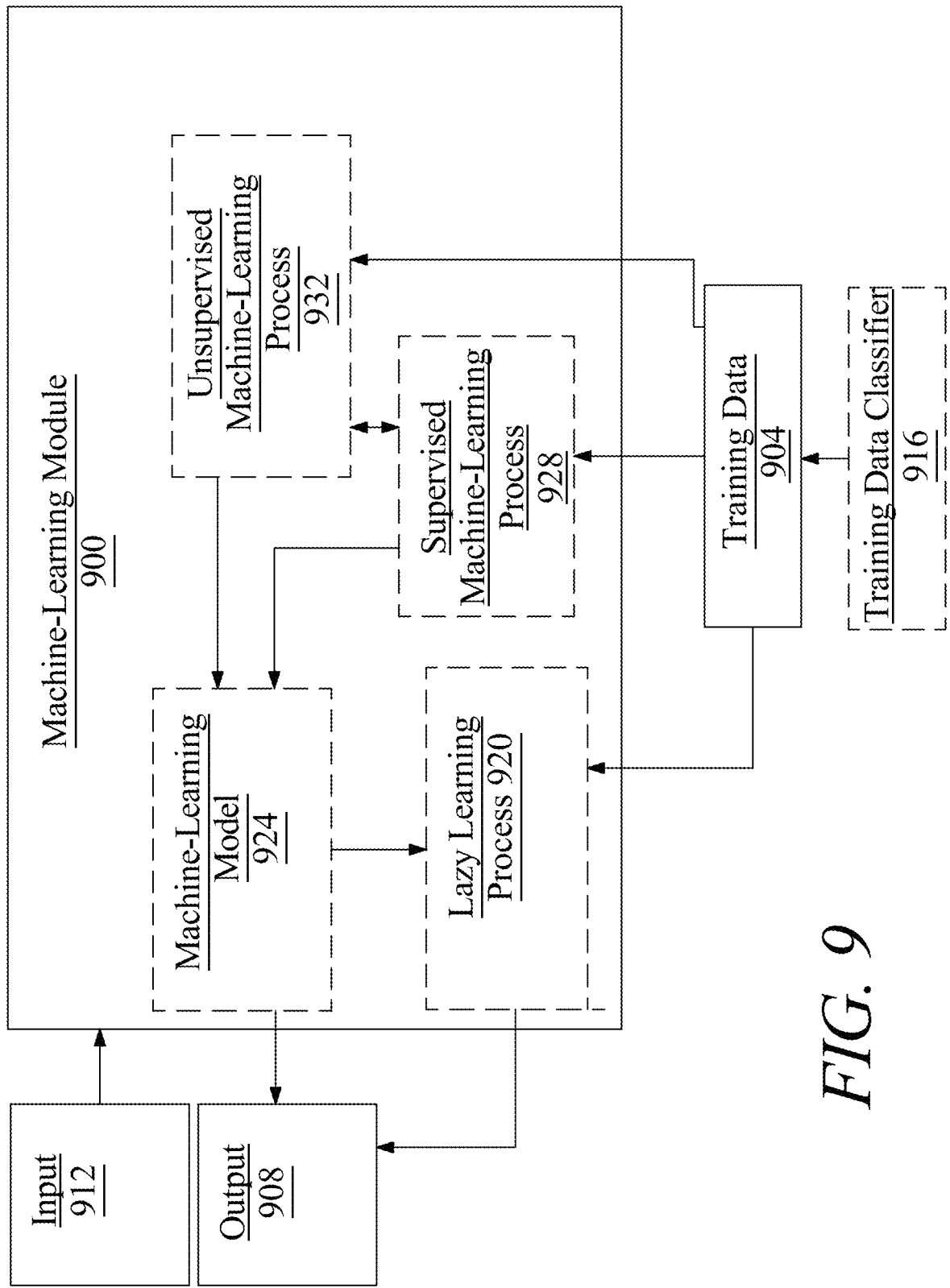
FIG. 9 is a block diagram of an exemplary embodiment of a machine-learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JAVASCRIPT Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example inputs of a corpus of documents may relate to outputs of a plurality of vectors in a vector space representing semantic relationships.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 916 may classify elements of training data to sub-categories of the corpus of documents such as child welfare cases, medical records, judicial cases, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the corpus of documents as described above as inputs, vectors as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
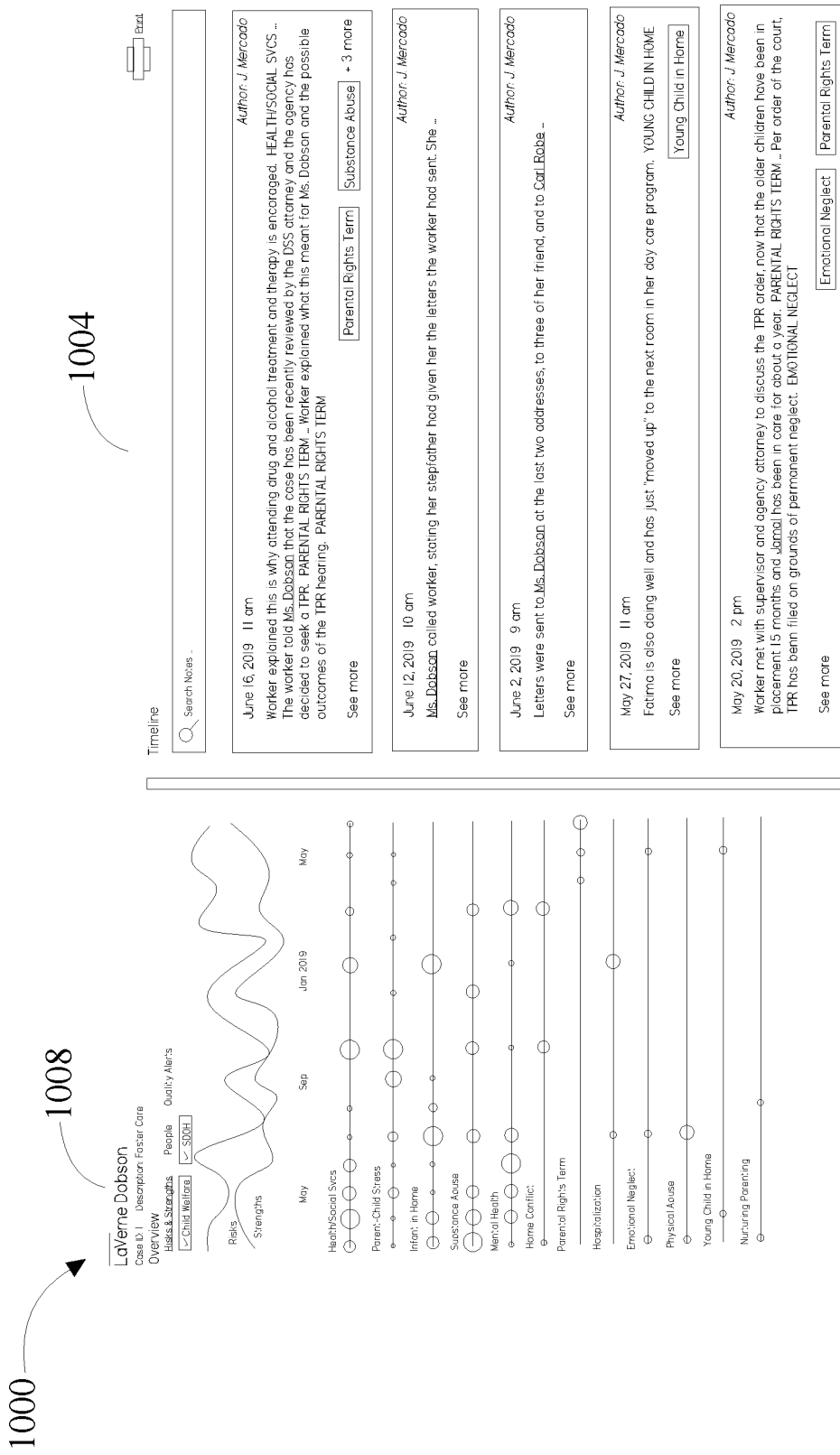
FIG. 10 illustrates an exemplary embodiment of a graphical user interface.

Referring now to FIG. 10, an exemplary embodiment of a graphical user interface (GUI) that may be employed in and/or with embodiments disclosed herein is illustrated. Any element and/or concept used in reference to FIG. 10 may be combined with and/or used in any other embodiment described in the disclosure. As shown in FIG. 10, GUI may include a case overview tab 1000. In embodiments, narrative data for a single case may be split up over hundreds to thousands of individual notes. Case overview tab 1000 may provide an ability for users to visualize and consume these notes with added information and functionality provided by a model and/or neural network 108 as described above. Case over view tab 1000 may include a first panel 1004 that displays text from each note organized by date; first panel 1004 may be positioned in any manner suitable for positioning of a frame, partition, or other division of a GUI window. For each note, for instance from current document sequence 132, key sentences may be highlighted by and/or as instructed by neural network 108 and tagged with their corresponding sentence category as determined by taxonomical categorization of sentences as described above. Full notes may be viewable in their entirety upon entry of a user command, such as a user clicking "See more". A second panel 1008 may summarize and display a historical timeline of tagged sentences at a case level. These categories may be sorted by prevalence, providing a caseworker with an overall outline of key elements pertaining to a case. A horizontal sequence of circles for each category may indicate when tagged sentences occurred within a case while a size of each circle may indicate a number of occurrences within a particular time period such as without limitation occurrences per month. Second panel 1008 may also be usable to navigate the case. Selecting a sentence category may filter first panel 1004 to display only notes containing a threshold number of sentences, such as without limitation at least one sentence, belonging to that particular category. Clicking individual circles on second panel 1008 may filter for both category and date.

Still referring to FIG. 10, users may also have an ability to provide label feedback. Selecting an event handler, such as clicking a tooltip for each tagged sentence, may open a window with an option to agree or disagree with a tag as well as provide an alternate tag should it be necessary. As another example, untagged sentences may be highlighted to suggest a label. These labels may proceed through an review process overseen by one or more user and/or entities purveying and/or consuming services of system to decide if such labels should be used for a subsequent round of training.

Figure 11:
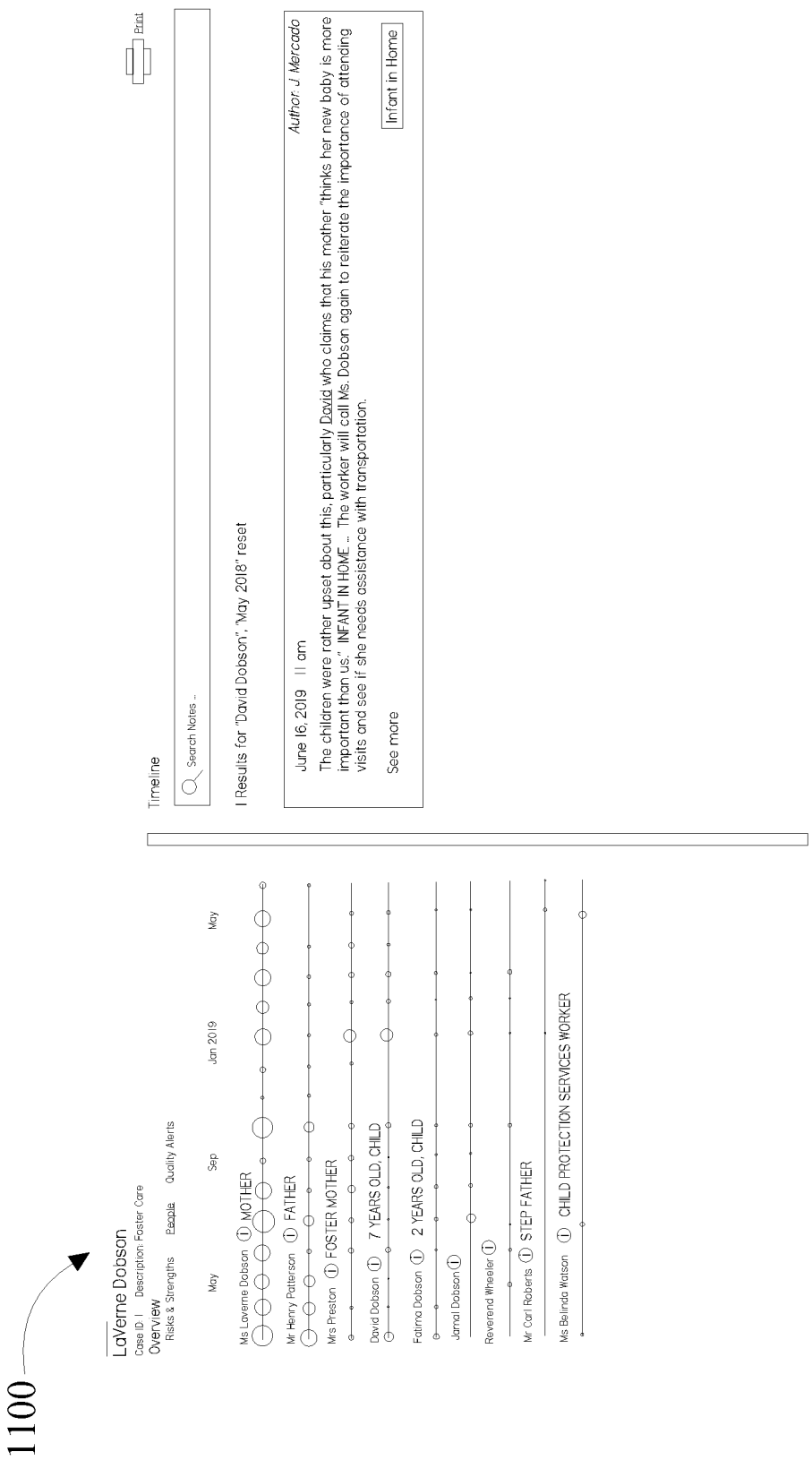
FIG. 11 illustrates an exemplary embodiment of a graphical user interface.

Referring now to FIG. 11, an exemplary embodiment of a people tab 1100 that may be presented in GUI is illustrated. In a non-limiting example, each note, document, and/or document sequence viewed through the product may have underlined named entities detected by neural network 108. In an embodiment, neural network 108 may perform entity detection at a note and/or document level, which may be followed by analysis by a second entity linking model, which may include any neural network and/or language processing model as described above, and may operate over all notes in a case and/or document sequence. Entity linking model may input all entity mentions within a case and output is a list of unique entities along with any detected role the entity may have in the case, using entity detection processes as described above. These unique entities, along with their role, may be viewed by clicking and/or selecting people tab 1100. For instance, "Mrs. Preston" may be identified as a foster mother of a child who is a subject of a case. In an embodiment, a display may be selected, for instance as instructed by a user entry, showing written variations detected by the entity linking model for a given named entity, such as "Ms. LaVerne Dobson"; such variations may include "LaVerne Dobson," "Mrs. Dobson," "Ms. Dobson," "LaVerne," or the like. Similarly to sentence categories in Case Overview Tab 1000, people may be sorted by prevalence with circles indicating both a number of occurrences and a time period of the occurrences. Clicking these circles may filters displayed notes. For instance, FIG. 11 depicts a scenario in which a selection for "May 2018" under "David Dobson" is activated. These filters may be used together with the sentence category filters as described above.

Figure 12:
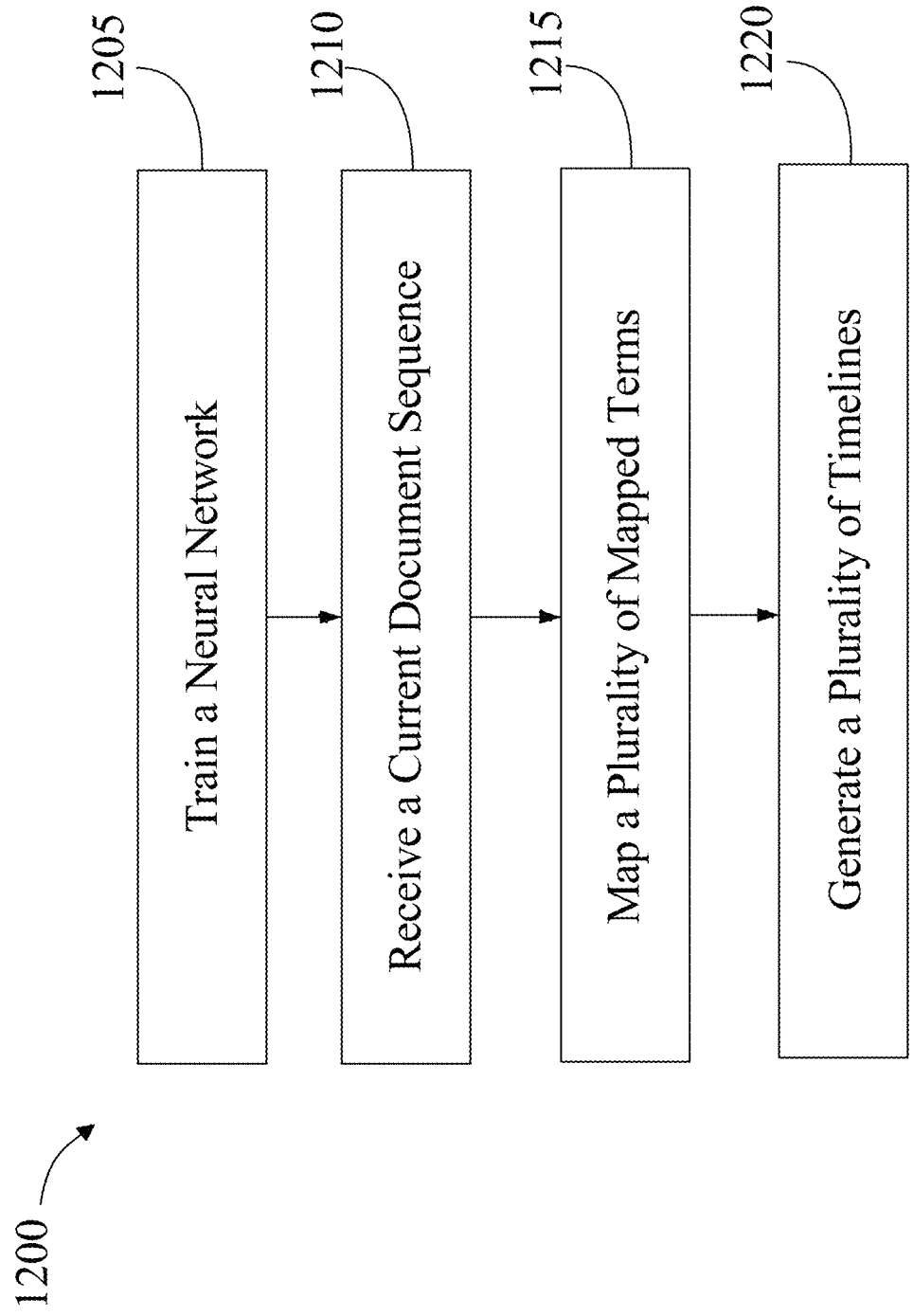
FIG. 12 is a process flow diagram illustrating an exemplary embodiment of a method for natural language processing for document sequences.

Now referring to FIG. 12, an exemplary embodiment of a method 1200 for natural language processing for document sequences is illustrated. At step 1205, a computing device 104 trains a neural network 108 as a function of a corpus of documents 112. Computing device 104 includes any of the computing device 104 as described above, in reference to FIGS. 1-7. Neural network 108 includes any of the neural network 108 as described above, in reference to FIGS. 1-7. Corpus of documents 112 includes any of the corpus of documents as described above, in reference to FIGS. 1-7. Neural network 108 is trained as a function of identifying a plurality of significant terms 116. Significant terms 116 includes any of the significant terms 116 as described above, in reference to FIGS. 1-7. Neural network 108 is trained by tuning neural network 108 to generate a plurality of vectors 120*a-m* for each significant term 116 of the plurality of significant terms 116. A plurality of vectors 120*a-m* include any of the plurality of vectors 120*a-m* as described above, in reference to FIGS. 1-7. A plurality of vectors 120*a-m* includes a vector in a vector space that represents a plurality of semantic relationships 124. A plurality of semantic relationships 124 includes any of the plurality of semantic relationships 124 as described above, in reference to FIGS. 1-7. A plurality of semantic relationships 124 represents a relationship between the plurality of significant terms 116 and a plurality of semantic units 128 in the corpus of documents 112. A plurality of semantic units 128 includes any of the plurality of semantic units 128 as described above, in reference to FIGS. 1-7.

Still referring to FIG. 12, at step 1210, computing device 104 receives a current document sequence 132 including a plurality of documents in a sequential order 136. A current document sequence 132 includes any of the current document sequence 132 as described above, in reference to FIGS. 1-7. Sequential order 136 includes any of the sequential order 136 as described above, in reference to FIGS. 1-7.

Still referring to FIG. 12, at step 1215, computing device 104 maps a plurality of mapped terms 140 of the plurality of significant terms 116 to the plurality of documents as a function of neural network 108 and the plurality of vectors 120*a-m*. Mapped terms 140 includes any of the mapped terms 140 as described above, in reference to FIGS. 1-7.

Still referring to FIG. 12, at step 1215, computing device 104 generates a plurality of timelines 144 as a function sequential order 136 and the plurality of mapped terms 140. A plurality of timelines 144 includes any of the plurality of timelines 144 as described above, in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
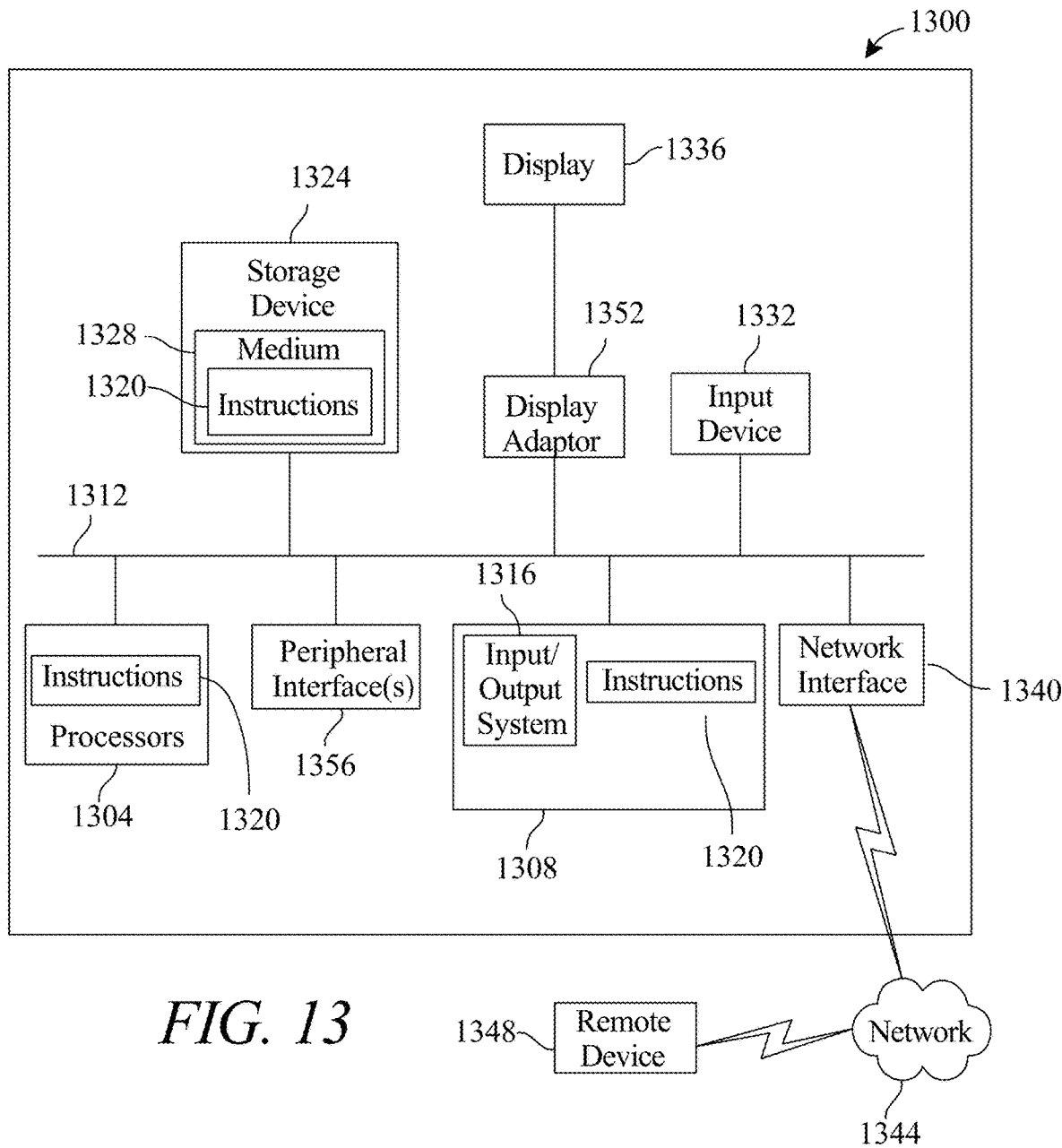
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for natural language processing for document sequences, the method comprising:
    training, by a computing device, a neural network as a function of a corpus of documents, wherein training the neural network comprises:
        receiving the corpus of documents;
        labeling at least a portion of the corpus of documents using a weak labeler, wherein labeling using the weak labeler comprises:
            a first stage of weak labeling including using a matching algorithm to match at least one of words and phrases based on patterns; and
            a second stage of weak labeling, directed to specific labels, based on Boolean expressions to create additional labels;
        identifying a plurality of significant terms; and
        tuning, as a function of the corpus of documents, the neural network to generate a plurality of vectors, the plurality of vectors including, for each significant term of the plurality of significant terms, a vector in a vector space, wherein the vector space represents a plurality of semantic relationships between the plurality of significant terms and a plurality of semantic units in the corpus of documents wherein the neural network outputs a term frequency-inverse document frequency of at least a vector of the plurality of vectors;
    receiving, by the computing device, a current document sequence including a plurality of documents in a sequential order;
    mapping, by the computing device, a plurality of mapped terms of the plurality of significant terms to the plurality of documents as a function of the neural network and the term frequency-inverse document frequency of the at least a vector of the plurality of vectors; and
    generating, by the computing device, a plurality of timelines as a function of the sequential order and the plurality of mapped terms, wherein:
        the plurality of timelines comprises a plurality of graphical representations, wherein each of the plurality of graphical representations is associated with a mapped term of the plurality of mapped terms as a function of a time metric, wherein, for each of the plurality of graphical representations, a size of the graphical representations for the associated mapped term is indicative of a number of occurrences of the associated mapped term within a particular time period; and
        one or more clusters of documents comprising documents of the plurality of documents, wherein each of the one or more clusters of documents is located on a timeline of the plurality of timelines as a function of the time metric, wherein the method further comprises:
        displaying the plurality of mapped terms;
        upon user-selection of at least one mapped term, displaying at least one timeline of the plurality of timelines corresponding to the at least one mapped term.

2. The method of claim 1, wherein training the neural network includes performing named entity recognition as a function of the corpus of documents and training the neural network as a function of the named entity recognition.

3. The method of claim 2, wherein a named entity timeline is produced as a function of the named entity recognition and the current document sequence.

4. The method of claim 1, wherein mapping a plurality of mapped terms further comprises:
    tokenizing the current document sequence;
    parsing the current document sequence into a plurality of current semantic units as a function of the significant terms;
    generating a plurality of current semantic unit vectors as a function of the plurality of current semantic units and the neural network, wherein each current semantic unit vector of the plurality of current semantic unit vectors represents a current semantic unit of the plurality of current semantic units; and mapping the plurality of current semantic unit vectors in the vector space as a function of the significant terms using a vector relationship model.

5. The method of claim 4, wherein the vector relationship model includes cosine similarity.

6. The method of claim 1, wherein representing semantic relationships includes generating a matrix and representing the semantic relationships as a function of the matrix.

7. The method of claim 6, wherein generating the matrix includes performing a singular value decomposition on the matrix.

8. The method of claim 1, wherein generating the plurality of timelines includes establishing a categorical element and generating a sequence timeline as a function of the categorical element.

9. The method of claim 1, wherein the method further comprises producing a query element as a function of the neural network.

10. The method of claim 9, wherein producing the query element further comprises:
generating a database storing a plurality of documents as a function of the neural network;
determining a vector similarity of at least a result of the database to a query term; and
producing the query element as a function of the vector similarity.

11. A system for natural language processing for document sequences, the system comprising a computing device comprising a processor, the computing device configured to:
train a neural network as a function of a corpus of documents, wherein training the neural network comprises:
receiving the corpus of documents;
labeling at least a portion of the corpus of documents using a weak labeler, wherein labeling using the weak labeler comprises:
a first stage of weak labeling including using a matching algorithm to match at least one of words and phrases based on patterns; and
a second stage of weak labeling, directed to specific labels, based on Boolean expressions to create additional labels;
identifying a plurality of significant terms; and
tuning, as a function of the corpus of documents, the neural network to generate a plurality of vectors, the plurality of vectors including, for each significant term of the plurality of significant terms, a vector in a vector space, wherein the vector space represents a plurality of semantic relationships between the plurality of significant terms and a plurality of semantic units in the corpus of documents, wherein the neural network outputs a term frequency-inverse document frequency of at least a vector of the plurality of vectors;
receive a current document sequence including a plurality of documents in a sequential order;
map a plurality of mapped terms of the plurality of significant terms to the plurality of documents as a function of the neural network and the term frequency-inverse document frequency of the at least a vector of the plurality of vectors; and
generate a plurality of timelines as a function of the sequential order and the plurality of mapped terms, wherein the plurality of timelines comprises:

a plurality of graphical representations, wherein each of the plurality of graphical representations is associated with a mapped term of the plurality of mapped terms as a function of a time metric, wherein, for each of the plurality of graphical representations, a size of the graphical representation for the associated mapped term is indicative of a number of occurrences of the associated mapped term within a particular time period; and
one or more clusters of documents comprising documents of the plurality of documents, wherein each of the one or more clusters of documents is located on a timeline of the plurality of timelines as a function of the time metric, wherein the computing device is further configured to:
display the plurality of mapped terms;
upon user-selection of at least one mapped term, display at least one timeline of the plurality of timelines corresponding to the at least one mapped term.

12. The system of claim 11, wherein training the neural network includes performing named entity recognition as a function of the corpus of documents and training the neural network as a function of the named entity recognition.

13. The system of claim 12, wherein a named entity timeline is produced as a function of the named entity recognition and the current document sequence.

14. The system of claim 11, wherein mapping a plurality of mapped terms further comprises:
tokenizing the current document sequence;
parsing the current document sequence into a plurality of current semantic units as a function of the significant terms;
generating a plurality of current semantic unit vectors as a function of the plurality of current semantic units and the neural network, wherein each current semantic unit vector of the plurality of current semantic unit vectors represents a current semantic unit of the plurality of current semantic units; and
mapping the plurality of current semantic unit vectors in the vector space as a function of the significant terms using a vector relationship model.

15. The system of claim 11, wherein training the neural network further comprises multi-task learning.

16. The system of claim 11, wherein representing semantic relationships includes generating a matrix and representing the semantic relationships as a function of the matrix.

17. The system of claim 16, wherein generating a matrix includes performing a singular value decomposition on the matrix.

18. The system of claim 11, wherein generating the plurality of timelines includes establishing a categorical element and generating a sequence timeline as a function of the categorical element.

19. The system of claim 11, wherein a search window is generated as a function of a concatenation database and the current document sequence.

20. The system of claim 11, wherein the computing device is further configured to produce a query element, wherein producing the query element further comprises:
generating a database storing a plurality of documents as a function of the neural network;
determining a vector similarity of at least a result of the database to a query term; and producing the query element as a function of the vector similarity.

\* \* \* \* \*